US010965752B1

(12) United States Patent
Smith

(10) Patent No.: US 10,965,752 B1
(45) Date of Patent: Mar. 30, 2021

(54) LIVE MIGRATION OF CLUSTERS IN CONTAINERIZED ENVIRONMENTS

(71) Applicant: Google LLC, Mountain View, CA (US)

(72) Inventor: Daniel Veritas Smith, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/579,945

(22) Filed: Sep. 24, 2019

Related U.S. Application Data

(60) Provisional application No. 62/899,794, filed on Sep. 13, 2019.

(51) Int. Cl.
| | | |
|---|---|---|
| *H04L 29/08* | (2006.01) | |
| *G06F 16/28* | (2019.01) | |
| *H04L 12/26* | (2006.01) | |

(52) U.S. Cl.
CPC ........ *H04L 67/1097* (2013.01); *G06F 16/285* (2019.01); *H04L 43/0817* (2013.01); *H04L 67/1008* (2013.01); *H04L 67/1034* (2013.01); *H04L 67/32* (2013.01)

(58) Field of Classification Search
CPC .............. G06F 16/285; H04L 43/0817; H04L 67/1008; H04L 67/1034; H04L 67/1097; H04L 67/32

See application file for complete search history.

(56) References Cited

U.S. PATENT DOCUMENTS

| 8,010,673 | B2* | 8/2011 | Dea ..................... H04L 67/1097 709/226 |
| 10,762,049 | B1* | 9/2020 | Liang .................... G06F 16/901 |
| 2003/0101265 | A1* | 5/2003 | Dantzig ............. H04L 67/1008 709/226 |
| 2010/0299666 | A1 | 11/2010 | Agbaria et al. |
| 2012/0222041 | A1* | 8/2012 | Sabin .................... G06F 9/5083 718/105 |

(Continued)

OTHER PUBLICATIONS

John et al. Blue/Green Deployments on AWS. Aug. 1, 2016 (Aug. 1, 2016), pp. 1-35, Retrieved from the Internet: <https://d1.awsstatic.com/whitepapers/AWS_Blue_Green_Deployments.pdf>. [retrieved on-Aug. 16, 2018].

(Continued)

*Primary Examiner* — Thomas J Dailey
(74) *Attorney, Agent, or Firm* — Lerner, David, Littenberg, Krumholz & Mentlik, LLP

(57) ABSTRACT

The technology provides for live migration from a first cluster to a second cluster. For instance, when requests to one or more cluster control planes are received, a predetermined fraction of the received requests may be allocated to a control plane of the second cluster, while a remaining fraction of the received requests may be allocated to a control plane of the first cluster. The predetermined fraction of requests are handled using the control plane of the second cluster. While handling the predetermined fraction of requests, it is detected whether there are failures in the second cluster. Based on not detecting failures in the second cluster, the predetermined fraction of requests allocated to the control plane of the second cluster may be increased in predetermined stages until all requests are allocated to the control plane of the second cluster.

18 Claims, 17 Drawing Sheets

(56) References Cited

U.S. PATENT DOCUMENTS

2013/0305242 A1    11/2013  Wang et al.
2016/0352836 A1*   12/2016  Kamalakantha ...... G06F 16/214

OTHER PUBLICATIONS

Fehling et al. Service Migration Patterns—Decision Support and Best Practices for the Migration of Existing Service-Based Applications to Cloud Environments. 2013 IEEE 6th International Conference on Service-Oriented Computing and Applications, IEEE, Dec. 16, 2013 (Dec. 16, 2013), pp. 9-16, DOI: 10.1109/SOCA. 2013.41 [retrieved on Jan. 20, 2014].
Extended European Search Report for European Patent Application No. 20195669.5 dated Feb. 2, 2021. 10 pages.

\* cited by examiner

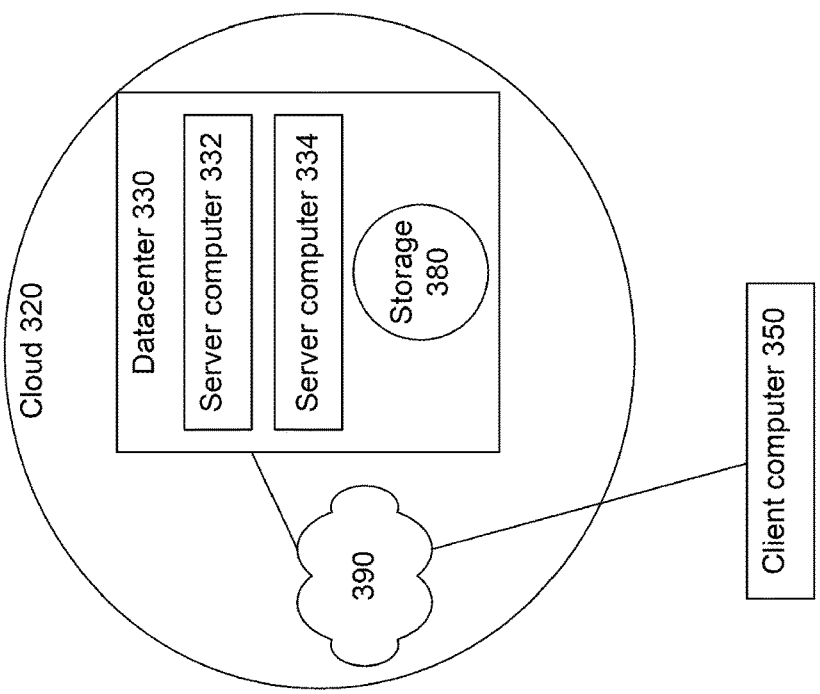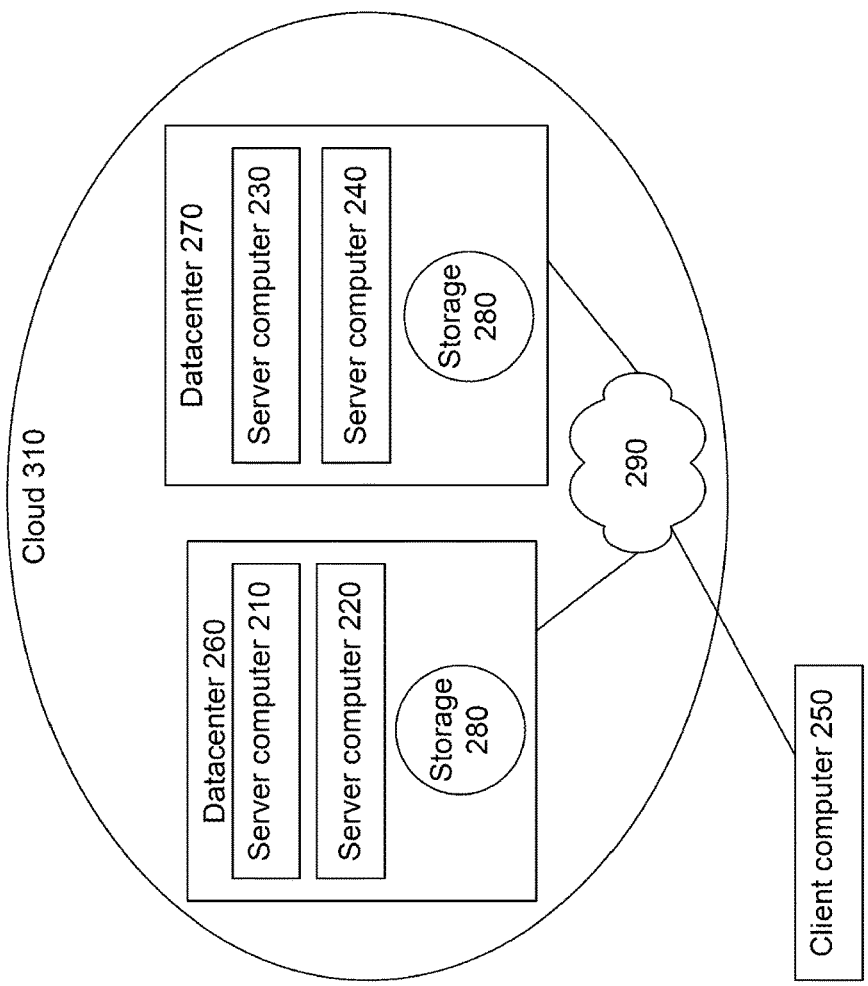
FIGURE 3

LIVE MIGRATION OF CLUSTERS IN CONTAINERIZED ENVIRONMENTS

CROSS-REFERENCE TO RELATED APPLICATIONS

This application claims the benefit of the filing date of U.S. Provisional Patent Application No. 62/899,794 filed Sep. 13, 2019, the disclosure of which is hereby incorporated herein by reference.

BACKGROUND

A containerized environment may be used to efficiently run applications on a distributed or cloud computing system. For instance, various services of an application may be packaged into containers. The containers may be grouped logically into pods, which may then be deployed on a cloud computing system, such as on a cluster of nodes that are virtual machines ("VM"). The cluster may include one or more worker nodes that run the containers, and one or more master nodes that manage the workloads and resources of the worker nodes according to various cloud and user defined configurations and policies. A cluster control plane is a logical service that runs on the master nodes of a cluster, which may include multiple software processes and a database storing current states of the cluster. To increase availability, master nodes in the cluster may be replicated, in which case a quorum of master node replicas must agree for the cluster to modify any state of the cluster. Clusters may be operated by a cloud provider or self-managed by an end user. For example, the cloud provider may have a cloud control plane that set rules and policies for all the clusters on the cloud, or provides easy ways for users to perform management tasks on the clusters.

When a cloud provider or an end user makes changes to an environment of a cluster, the changes may carry risks to the cluster. Example environment changes may include software upgrades, which may be upgrades for the nodes, for the cluster control plane, or for the cloud control plane. Another example environment change may include movement of a cluster's resources between locations, such as between datacenters at different physical locations, or between different logical locations, such as regions or zones within the same datacenter. Additionally, a user may wish to migrate from a self-managed cluster—where the user is operating as the cloud provider—to a cluster managed by a cloud provider, or generally between two clusters managed by different cloud providers. Such a migration carries risks because it involves transitioning the cluster's control plane to the control of the new cloud provider. As still another example, a user may wish to change clouds for a cluster without stopping the cluster, which may be risky to the processes that are currently running in the cluster.

FIGS. 1A and 1B illustrate a current process to change an environment of a cluster, in particular a software upgrade for the cluster control plane. For instance, the cloud control plane may introduce a software upgrade, such as a new version of configurations and policies for VMs hosted by the cloud provider. As shown in FIG. 1A, to switch a cluster from the old version "v1.1" to the new version "v1.2," the cloud control plane deletes an old master node in the cluster and creates in its place a new master node. During this replacement process as shown in FIG. 1B, the new master node may be blocked from being attached to a persistent disk ("PD") until the old master node is detached from the PD and the old master node is deleted.

SUMMARY

The present disclosure provides for migrating from a first cluster to a second cluster, which comprises receiving, by one or more processors, requests to one or more cluster control planes, wherein the one or more cluster control planes include a control plane of the first cluster and a control plane of the second cluster; allocating, by the one or more processors, a predetermined fraction of the received requests to the control plane of the second cluster, and a remaining fraction of the received requests to the control plane of the first cluster; handling, by the one or more processors, the predetermined fraction of requests using the control plane of the second cluster; detecting, by the one or more processors, whether there are failures in the second cluster while handling the predetermined fraction of requests; and increasing, by the one or more processors, based on not detecting failures in the second cluster, the predetermined fraction of requests allocated to the control plane of the second cluster in predetermined stages until all received requests are allocated to the control plane of the second cluster.

The received requests may be allocated by cluster bridging aggregators of the first cluster and cluster bridging aggregators of the second cluster, wherein the first cluster and the second cluster are operated on a same cloud. The received requests may include requests from a workload running in the first cluster, wherein the requests from the workload may be intercepted by a sidecar container injected in the first cluster and routed to cluster bridging aggregators of the second cluster, wherein the first cluster and the second cluster are operated on different clouds.

The allocation of the received requests may be performed in a plurality of predetermined stages, wherein the requests are directed to either the first cluster or the second cluster based on one or more of: user-agent, user account, user group, object type, resource type, a location of the object, or a location of a sender of the request.

The method may further comprise joining, by the one or more processors, one or more databases in the control plane of the second cluster to a quorum including one or more databases in the control plane of the first cluster, wherein the first cluster and the second cluster are running on a same cloud. The method may further comprise synchronizing, by the one or more processors, one or more databases in the control plane of the second cluster with one or more databases in the control plane of the first cluster, wherein the first cluster and the second cluster are operated on different clouds.

The method may further comprise allocating, by the one or more processors, a predetermined fraction of object locks to one or more controllers of the second cluster, and a remaining fraction of object locks to one or more controllers of the first cluster; actuating, by the one or more processors, objects locked by the one or more controllers of the second cluster; detecting, by the one or more processors, whether there are failures in the second cluster while actuating the objects locked; increasing, by the one or more processors based on not detecting failures in the second cluster, the predetermined fraction of object locks allocated to the one or more controllers of the second cluster.

The method may further comprise determining, by the one or more processors, that all received requests are allocated to the control plane of the second cluster; deleting, by the one or more processors based on the determination, the control plane of the first cluster, wherein the first cluster and the second cluster are operated on the same cloud. The method may further comprise stopping, by the one or more processors based on detecting one or more failures in the second cluster, allocation of the received requests to the control plane of the second cluster. The method may further comprise generating, by the one or more processors based on detecting one or more failures in the second cluster, output including information on the detected failures. The method may further comprise decreasing, by the one or more processors based on detecting failures in the second cluster, the predetermined fraction of requests allocated to the control plane of the second cluster until all received requests are allocated to the control plane of the first cluster. The method may further comprise determining, by the one or more processors, that all received requests are allocated to the control plane of the first cluster; deleting, by the one or more processors based on the determination, the second cluster.

The method may further comprise scheduling, by the one or more processors, a pod in the second cluster; recording, by the one or more processors, states of a pod in the first cluster; transmitting, by the one or more processors, the recorded states of the pod in the first cluster to the pod in the second cluster. The method may further comprise pausing, by the one or more processors, execution of workloads by the pod in the first cluster; copying, by the one or more processors, changes in states of the pod in the first cluster since recording the states of the pod in the first cluster; transmitting, by the one or more processors, the copied changes in states to the pod in the second cluster; resuming, by the one or more processors, execution of workloads by the pod in the second cluster; forwarding, by the one or more processors, traffic directed to the pod in the first cluster to the pod in the second cluster; deleting, by the one or more processors, the pod in the first cluster.

The method may further comprise determining, by the one or more processors, that a first worker node in the first cluster has one or more pods to be moved to the second cluster; creating, by the one or more processors, a second worker node in the second cluster; preventing, by the one or more processors, the first worker node in the first cluster from adding new pods; moving, by the one or more processors, the one or more pods in the first worker node to the second worker node in the second cluster; determining, by the one or more processors, that the first worker node in the first cluster no longer has pods to be moved to the second cluster; deleting, by the one or more processors, the first worker node in the first cluster.

The method may further comprise receiving, by the one or more processors, requests to one or more workloads, wherein the one or more workloads include workloads running in the first cluster and workloads running in the second cluster; allocating, by the one or more processors using at least one global load balancer, the received requests to the one or more workloads between the workloads running in the first cluster and the workloads running in the second cluster.

The method may further comprise determining, by the one or more processors, that a pod running in the second cluster references a storage of the first cluster; creating, by the one or more processors, a storage in the second cluster, wherein the storage of the first cluster and the storage of the second cluster are located at different locations; reading, by the one or more processors using a storage driver, the storage of the second cluster for data related to the pod in the second cluster; reading, by the one or more processors using the storage driver, the storage of the first cluster for data related to the pod in the second cluster. The method may further comprise writing, by the one or more processors, changes made by the pod in the second cluster to the storage of the second cluster; copying, by the one or more processors, data unchanged by the pod from the storage of the first cluster to the storage of the second cluster.

The present disclosure further provides for a system for migrating from a first cluster to a second cluster, the system comprising one or more processors configured to: receive requests to one or more cluster control planes, wherein the one or more cluster control planes include a control plane of the first cluster and a control plane of the second cluster; allocate a predetermined fraction of the received requests to the control plane of the second cluster, and a remaining fraction of requests to the control plane of the first cluster; handle the predetermined fraction of requests using the control plane of the second cluster; detect whether there are failures in the second cluster while handling the predetermined fraction of requests; and increase, based on not detecting failures in the second cluster, the predetermined fraction of requests allocated to the control plane of the second cluster in predetermined stages until all received requests are allocated to the control plane of the second cluster.

The first cluster and the second cluster may be at least one of: operating different software versions, operating at different locations, operating on different clouds provided by different cloud providers, operating on different clouds where at least one is a user's on-premise datacenter, or connected to different networks.

BRIEF DESCRIPTION OF THE DRAWINGS

FIG. 3 shows an example distributed system where live cluster migration may occur in accordance with aspects of the disclosure.

DETAILED DESCRIPTION

Overview

Figure 1A:
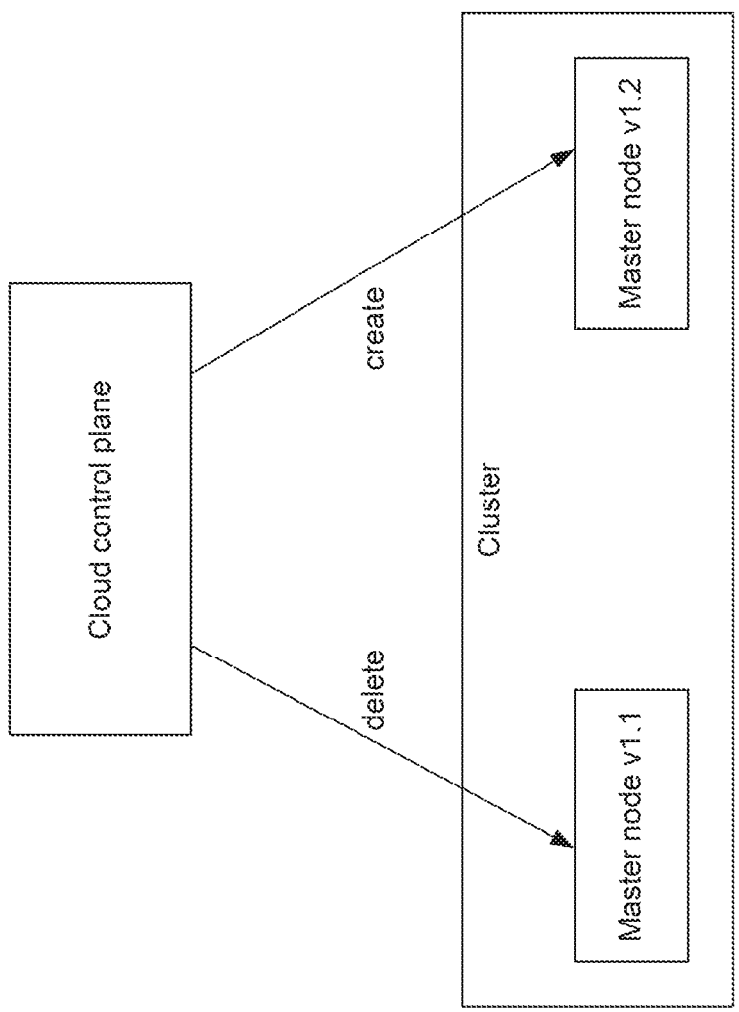
FIGS. 1A and 1B illustrate an existing process for implementing environment change for a cluster.

The technology relates generally to modifying an environment of a cluster of nodes in a distributed computing environment. To reduce the risks and downtime for environment changes involved in software upgrades, or moving between locations, networks, or clouds, a system is configured to modify the environment of a cluster via a live migration in a staged rollout. In this regard, while a first, source cluster is still running, a second, destination cluster may be created.

During the live migration, operations are handled by both the source cluster and the destination cluster. In this regard, various operations and/or components may be gradually shifted from being handled by the source cluster to being handled by the destination cluster. The shift may be a staged rollout, where in each stage, a different set of operations and/or components may be shifted from the source cluster to the destination cluster. Further, to mitigate damage in case of failure, within each stage, shifting operations or components from the source cluster to the destination cluster may be gradual or "canaried." The live migration may be performed for the control planes of the clusters, as well as the workloads of the clusters.

For instance, during live migration of the cluster control plane, traffic may be allocated between the cluster control plane of the source cluster and the cluster control plane of the destination cluster. In this regard, where the source cluster and the destination cluster are operated on the same cloud, cluster bridging aggregators may be configured to route incoming requests, such as API calls from user applications and/or from workloads, to cluster control planes of both the source cluster and the destination cluster. Where the source cluster and the destination cluster are operated on different clouds, in particular where one of the clouds may not support cluster migration, one or more sidecar containers may be injected in the cluster that does not have cluster bridging aggregators. These sidecar containers may intercept and route API calls to the cluster having cluster bridging aggregators for further routing/re-routing.

Allocation of request traffic for the cluster control plane may be canaried during the live migration. For instance, initially a predetermined fraction of requests may be allocated to the cluster control plane of the destination cluster, while the remaining fraction of requests may be allocated to the cluster control plane of the source cluster. The destination cluster may be monitored while its cluster control plane is handling the predetermined fraction of requests. If no failures are detected, then allocation of requests to the cluster control plane of the destination cluster may be gradually increased, until all requests are eventually allocated to cluster control plane of the destination cluster.

Allocation of requests between the cluster control planes of the source cluster and the destination cluster may be based on predetermined rules. For example, the requests may be allocated based on resource type, object type, or location. Further, the requests may be allocated in predetermined stages.

As another example, during the live migration of the cluster control plane, object actuation may be allocated between the cluster control plane of the source cluster and the cluster control plane of the destination cluster. To further mitigate damage in case of failure, allocation of object actuation may also be canaried. For instance, at first, a predetermined fraction of object locks may be allocated to controllers of the destination cluster, while the remaining fraction of object locks may be allocated to controllers of the source cluster. The destination cluster may be monitored while actuating the objects locked by the predetermined fraction of object locks. If no failures are detected, or at least no additional failures that were not already occurring in the source cluster prior to the migration, then allocation of object locks to controllers of the destination cluster may be increased, until all objects are eventually actuated by controllers of the destination cluster.

Further, consistent data storage for the cluster control plane is to be maintained during the live migration. In this regard, if the source cluster and the destination cluster are in the same datacenter and thus share the same storage backend, databases of the source cluster and the destination cluster may be bridged, for example by joining a same quorum. On the other hand, if the source cluster and the destination cluster are operated on different locations or clouds such that they do not have access to each other's storage backend, databases of the source cluster and the destination cluster may be synchronized.

Still further, a migration may also be performed for workloads running in the cluster. In this regard, migration of the workloads may also be live. For example, as new nodes are created in the destination cluster, pods may be created in the destination cluster. Rather than immediately deleting the pods in the source cluster, execution of pods in the source cluster may be paused. States of the pods in the source cluster may be transmitted into the pods in the destination cluster, and execution may resume in the pods in the destination cluster. Additionally, a global load balancer may be configured to route requests to workloads running in both the source cluster and the destination cluster. Where the workload migration is between different locations or clouds, live storage migration may be performed for workloads to change the location of the storage for the workloads.

Once all components of the cluster control plane and/or all components of the workloads are shifted to the destination cluster, and that there is no additional failures that were not already occurring in the source cluster prior to the migration, the source cluster may's components may be deallocated or deleted. However, if failures are detected during or after the live migration, the live migration may be stopped. Additionally, a rollback may be initiated from the destination cluster back to the source cluster, and the destination cluster's components may be deallocated and deleted.

The technology is advantageous because it provides a gradual and monitored rollout process for modifying cluster infrastructure. The staged and canaried rollout process provides more opportunity to stop the upgrade in case issues arise, therefore preventing large scale damage. Traffic allocation, such as for requests to cluster control plane and/or requests to workloads, between the simultaneously running source and destination clusters may reduce or eliminate downtime during upgrade. Further, due to the traffic allocation, from the perspective of the client it may appear as if only one cluster existed during the live migration. In case of a failed upgrade, the system also provides rollback options since the source cluster is not deleted unless a successful upgrade is completed. The technology further provides features to enable live migration between clusters located in different locations, as well as between clusters operated on different clouds where one of the clouds does not support live migration.

Example Systems

Figure 2:
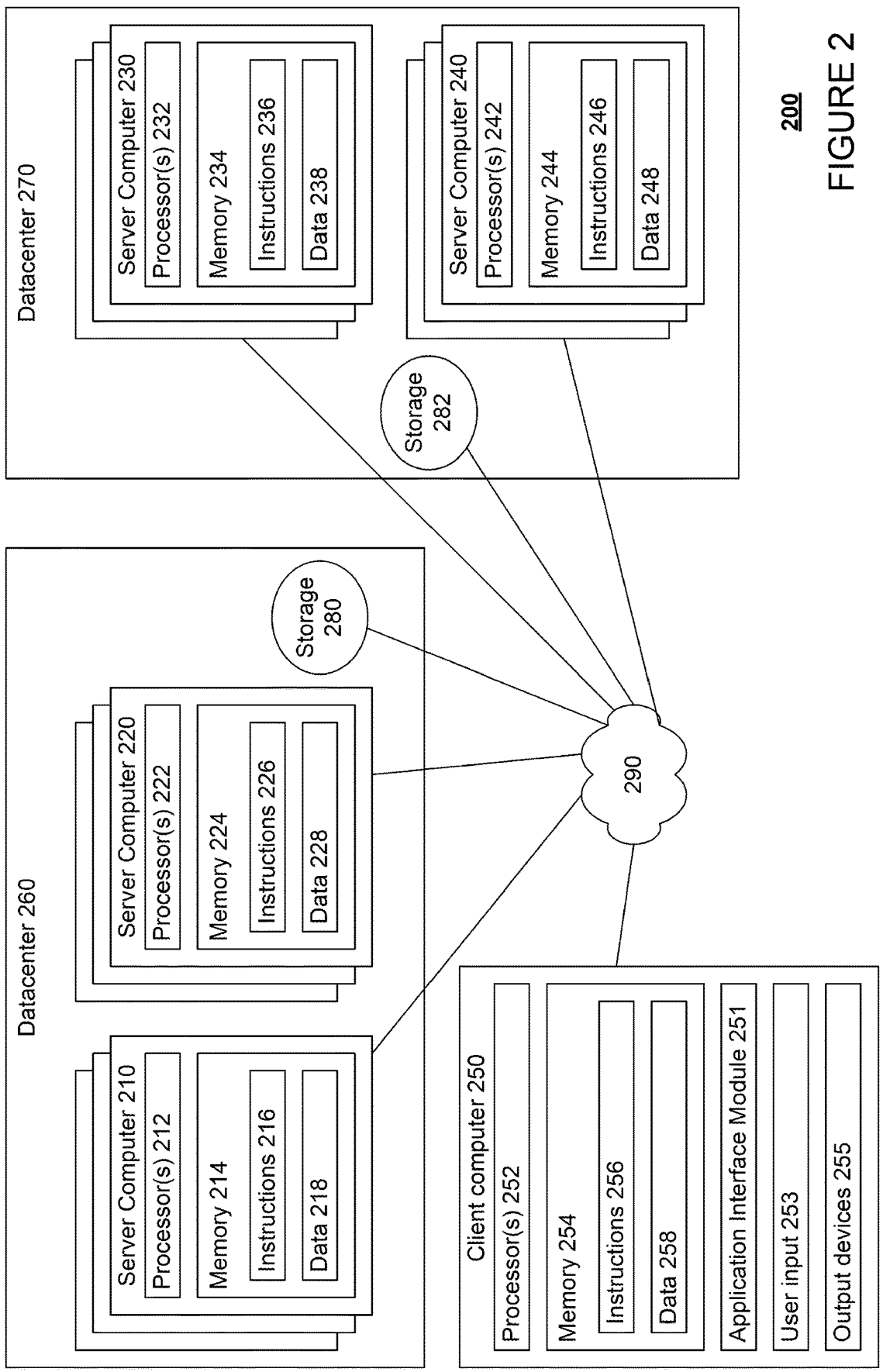
FIG. 2 shows an example distributed system on which a cluster may be operated in accordance with aspects of the disclosure.

FIG. 2 is a functional diagram showing an example distributed system 200 on which clusters may be operated. As shown, the system 200 may include a number of computing devices, such as server computers 210, 220, 230, 240 coupled to a network 290. For instance, the server computers 210, 220, 230, 240 may be part of a cloud computing system operated by a cloud provider. The cloud provider may further maintain one or more storages, such as storage 280 and storage 282. Further as shown, the system 200 may include one or more client computing devices, such as client computer 250 capable of communication with the server computers 210, 220, 230, 240 over the network 290.

The server computers 210, 220, 230, 240 and storages 280, 282 may be maintained by the cloud provider in one or more datacenters. For example as shown, server computers 210, 220 and storage 280 may be located in datacenter 260, while server computers 230, 240 and storage 282 may be located in another datacenter 270. The datacenters 260, 270 and/or server computers 210, 220, 230, 240 may be positioned at a considerable distance from one another, such as in different cities, states, countries, continents, etc. Further, within the datacenters 260, 270, there may be one or more regions or zones. For example, the regions or zones may be logically divided based on any appropriate attribute.

Clusters may be operated on the distributed system 200. For example, a cluster may be implemented by one or more processors in a datacenter, such as by processors 212 of server computers 210, or by processors 232 and 242 of server computers 230 and 240. Further, storage systems for maintaining persistent and consistent records of states of the clusters, such as persistent disks ("PD"), may be implemented on the cloud computing system, such as in storages 280, 282, or in data 218, 228, 238, 248 of server computers 210, 220, 230, 240.

Server computers 210, 220, 230, 240 may be configured similarly. For example as shown, the server computer 210 may contain one or more processor 212, memory 214, and other components typically present in general purpose computers. The memory 214 can store information accessible by the processors 212, including instructions 216 that can be executed by the processors 212. Memory can also include data 218 that can be retrieved, manipulated or stored by the processors 212. The memory 214 may be a type of non-transitory computer readable medium capable of storing information accessible by the processors 212, such as a hard-drive, solid state drive, tape drive, optical storage, memory card, ROM, RAM, DVD, CD-ROM, write-capable, and read-only memories. The processors 212 can be a well-known processor or other lesser-known types of processors. Alternatively, the processor 212 can be a dedicated controller such as a GPU or an ASIC, for example, a TPU.

The instructions 216 can be a set of instructions executed directly, such as computing device code, or indirectly, such as scripts, by the processors 212. In this regard, the terms "instructions," "steps" and "programs" can be used interchangeably herein. The instructions 216 can be stored in object code format for direct processing by the processors 212, or other types of computer language including scripts or collections of independent source code modules that are interpreted on demand or compiled in advance. Functions, methods, and routines of the instructions are explained in more detail in the foregoing examples and the example methods below. The instructions 216 may include any of the example features described herein.

The data 218 can be retrieved, stored or modified by the processors 212 in accordance with the instructions 216. For instance, although the system and method is not limited by a particular data structure, the data 218 can be stored in computer registers, in a relational or non-relational database as a table having a plurality of different fields and records, or as JSON, YAML, proto, or XML documents. The data 218 can also be formatted in a computer-readable format such as, but not limited to, binary values, ASCII or Unicode. Moreover, the data 218 can include information sufficient to identify relevant information, such as numbers, descriptive text, proprietary codes, pointers, references to data stored in other memories, including other network locations, or information that is used by a function to calculate relevant data.

Although FIG. 2 functionally illustrates the processors 212 and memory 214 as being within the same block, the processors 212 and memory 214 may actually include multiple processors and memories that may or may not be stored within the same physical housing. For example, some of the instructions 216 and data 218 can be stored on a removable CD-ROM and others within a read-only computer chip. Some or all of the instructions and data can be stored in a location physically remote from, yet still accessible by, the processors 212. Similarly, the processors 212 can include a collection of processors that may or may not operate in parallel. The server computers 210, 220, 230, 240 may each include one or more internal clocks providing timing information, which can be used for time measurement for operations and programs run by the server computers 210, 220, 230, 240.

The server computers 210, 220, 230, 240 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. In some instances, the server computers 210, 220, 230, 240 may be virtualized environments.

Server computers 210, 220, 230, 240, and client computer 250 may each be at one node of network 290 and capable of directly and indirectly communicating with other nodes of the network 290. For example, the server computers 210, 220, 230, 240 can include a web server that may be capable of communicating with client computer 250 via network 290 such that it uses the network 290 to transmit information to an application running on the client computer 250. Server computers 210, 220, 230, 240 may also be computers in one or more load balanced server farms, which may exchange information with different nodes of the network 290 for the purpose of receiving, processing and transmitting data to client computer 250. Although only a few server computers 210, 220, 230, 240, storages 280, 282, and datacenters 260, 270 are depicted in FIG. 2, it should be appreciated that a typical system can include a large number of connected server computers, a large number of storages, and/or a large number of datacenters with each being at a different node of the network 290.

The client computer 250 may also be configured similarly to server computers 210, 220, 230, 240, with processors 252, memories 254, instructions 256, and data 258. The client computer 250 may have all of the components normally used in connection with a personal computing device such as a central processing unit (CPU), memory (e.g., RAM and internal hard drives) storing data and instructions, input and/or output devices, sensors, clock, etc. Client computer 250 may comprise a full-sized personal computing device, they may alternatively comprise mobile computing devices capable of wirelessly exchanging data with a server over a network such as the Internet. For instance, client computer 250 may be a desktop or a laptop computer, or a mobile phone or a device such as a wireless-enabled PDA, a tablet PC, or a netbook that is capable of obtaining information via the Internet, or a wearable computing device, etc.

The client computer 250 may include an application interface module 251. The application interface module 251 may be used to access a service made available by one or more server computers, such as server computers 210, 220, 230, 240. The application interface module 251 may include sub-routines, data structures, object classes and other type of software components used to allow servers and clients to communicate with each other. In one aspect, the application interface module 251 may be a software module operable in conjunction with several types of operating systems known in the arts. Memory 254 may store data 258 accessed by the application interface module 251. The data 258 can also be stored on a removable medium such as a disk, tape, SD Card or CD-ROM, which can be connected to client computer 250.

Further as shown in FIG. 2, client computer 250 may include one or more user inputs 253, such as keyboard, mouse, mechanical actuators, soft actuators, touchscreens, microphones, sensors, and/or other components. The client computer 250 may include one or more output devices 255, such as a user display, a touchscreen, one or more speakers, transducers or other audio outputs, a haptic interface or other tactile feedback that provides non-visual and non-audible information to the user. Further, although only one client computer 250 is depicted in FIG. 2, it should be appreciated that a typical system can serve a large number of client computers being at a different node of the network 290. For example, the server computers in the system 200 may run workloads for applications on a large number of client computers.

As with memory 214, storage 280, 282 can be of any type of computerized storage capable of storing information accessible by one or more of the server computers 210, 220, 230, 240, and client computer 250, such as a hard-drive, memory card, ROM, RAM, DVD, CD-ROM, write-capable, and read-only memories. In some instances, the storage 280, 282 may include one or more persistent disk ("PD"). In addition, storage 280, 282 may include a distributed storage system where data is stored on a plurality of different storage devices which may be physically located at the same or different geographic locations. Storage 280, 282 may be connected to computing devices via the network 290 as shown in FIG. 2 and/or may be directly connected to any of the server computers 210, 220, 230, 240, and client computer 250.

Server computers 210, 220, 230, 240, and client computer 250 can be capable of direct and indirect communication such as over network 290. For example, using an Internet socket, the client computer 250 can connect to a service operating on remote server computers 210, 220, 230, 240 through an Internet protocol suite. Server computers 210, 220, 230, 240 can set up listening sockets that may accept an initiating connection for sending and receiving information. The network 290, and intervening nodes, may include various configurations and protocols including the Internet, World Wide Web, intranets, virtual private networks, wide area networks, local networks, private networks using communication protocols proprietary to one or more companies, Ethernet, WiFi (for instance, 802.81, 802.81b, g, n, or other such standards), and HTTP, and various combinations of the foregoing. Such communication may be facilitated by a device capable of transmitting data to and from other computers, such as modems (for instance, dial-up, cable or fiber optic) and wireless interfaces.

FIG. 3 is a functional diagram showing an example distributed system 300 on which live cluster migration may occur. Distributed system 300 includes a first cloud 310 and a second cloud 320. As shown, cloud 310 may include server computers 210, 220, 230, 240 in datacenters 260, 270, and storages 280, 282 connected to network 290. One or more client computers, such as client computer 250 may be connected to the network 290 and using the services provided by cloud 310. Further as shown, cloud 320 may similarly include computing devices, such as server computers 332, 334 organized in one or more datacenters such as datacenter 330, and one or more storages such as storage 380, connected to a network 390. One or more client computers, such as client computer 350 may be connected to the network 390 and using the services provided by cloud 320. Although only a few server computers, datacenters, storage, and client computer are depicted in FIG. 3, it should be appreciated that a typical system can include a large number of connected server computers, a large number of datacenters, a large number of storages, and/or a large number of client computers, with each being at a different node of the network.

Cloud 310 and cloud 320 may be operated by different cloud providers. As such, cloud 310 and cloud 320 may have different configurations such that clusters operated on cloud 310 and cloud 320 are running in different software environments. Further, clusters hosted by cloud 310 and cloud 320 may or may not share any storage backend, be connected to the same network, or be in the same physical locations. As such, clusters on cloud 310 and cloud 320 may not be able to modify or even access resources, software components, and/or configurations in each other. In some instances, one or both of cloud 310 and cloud 320 may be self-managed by a user.

Live cluster migration in the distributed system 300 may occur in any of a number of ways. For instance, while a cluster is running in datacenter 260, the cloud provider for cloud 310 may introduce a software upgrade for the cloud control plane, the cluster control plane running on the master nodes, or the worker nodes. As such, a migration may be performed for objects in the cluster to a destination cluster created in datacenter 260 that conforms with the software upgrade. In such instances, the migration is within the same datacenter 260, on the same network 290, and in the same cloud 310.

As another example, live cluster migration may include moving between physical locations. For instance, a cloud provider for cloud 310 may be relocating resources, or a developer of the application running on the cluster may want to move to a different location, etc. As such, a migration may be performed for objects in the cluster in datacenter 260 to a destination cluster created in datacenter 270. In such cases the migration may still be within the same network 290 and the same cloud 310.

Sometimes, however, a user may want to switch from using one cloud, which may be self-managed or operated by one cloud operator, to another cloud operated by a different cloud operator. For example, a live migration may be performed for objects in a cluster on cloud 320 to a destination cluster created in cloud 310. In addition to changing clouds, such a migration may in some cases involve a change in network and/or a change in region.

As further explained in examples below, for migration between clouds, one or both of cloud 310 and cloud 320 may be configured with features for performing live cluster migrations. For example, in instances where cloud 310 and cloud 320 both include features for performing live cluster migrations, these features may together facilitate the live cluster migration. In instances where cloud 310 includes features for performing live cluster migrations, while cloud 320 does not include features for performing live cluster migrations, cloud 310 and the migrating cluster on cloud 310 may use additional tools and methods to facilitate the migration, while such are not available to the cloud 320 and the migrating cluster on cloud 320.

Figure 4:
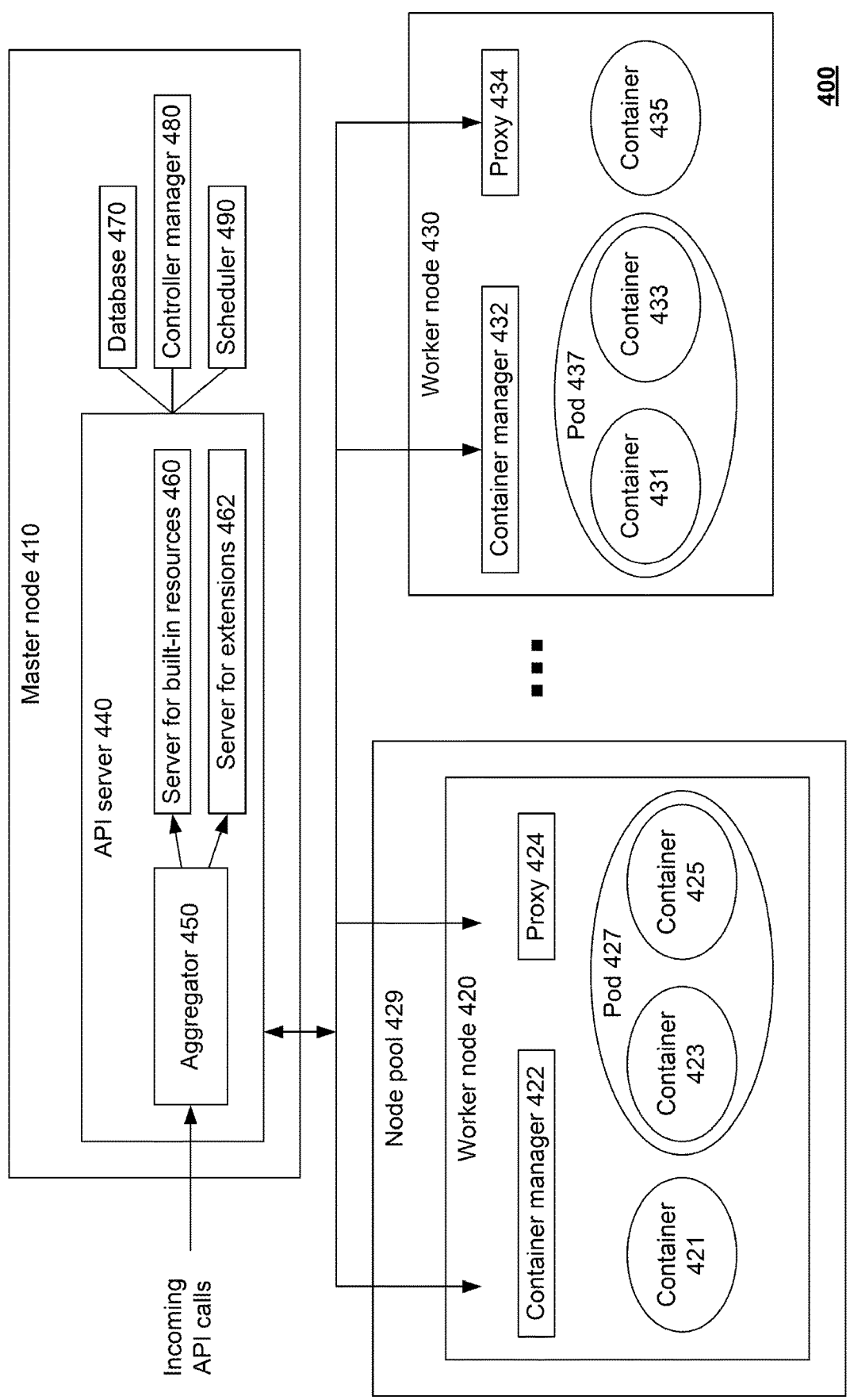
FIG. 4 shows an example cluster in accordance with aspects of the disclosure.

FIG. 4 is a functional diagram illustrating an example cluster 400. For instance, a user, such as a developer, may design an application, and provide configuration data for the application using a client computer, such as client computer 250 of FIG. 2. The container orchestration architecture provided by a cloud, such as cloud 310 of FIG. 3, may be configured to package various services of the application into containers. The container orchestration architecture may be configured to allocate resources for the containers, load balance services provided by the containers, and scale the containers (such as by replication and deletion).

As shown in FIG. 4, the container orchestration architecture may be configured as a cluster 400 including one or more master nodes, such as master node 410 and a plurality of worker nodes, such as worker node 420 and worker node 430. Each node of the cluster 400 may be running on a physical machine or a virtual machine. The cluster 400 may be running on a distributed system such as system 200. For example, nodes of the cluster 400 may be running on one or more processors in datacenter 260 shown in FIG. 2. The master node 410 may control the worker nodes 420, 430. The worker nodes 420, 430 may include containers of computer code and program runtimes that form part of a user application.

Further as shown, in some instances, the containers may be further organized into one or more pods. For example as shown in FIG. 4, the worker node 420 may include containers 421, 423, 425, where containers 423 and 425 are organized into a pod 427, while the worker node 430 may include containers 431, 433, 435, where containers 431 and 433 are organized into a pod 437. The containers and pods of the worker nodes may have various workloads running on them, for example the workloads may serve content for a website or processes of an application. The pods may belong to "services," which expose the pod to network traffic from users of the workloads, such as users of an application or visitors of a website. One or more load balancers may be configured to distribute traffic, for example requests from the services, to the workloads running on the cluster 400. For example the traffic may be distributed between the pods in the worker nodes of the cluster 400.

Still further, some of the nodes, such as worker node 420, may be logically organized as part of a node pool, such as node pool 429. For example, a node pool may be a group of nodes sharing one or more attributes, such as memory size, CPU/GPU attached, etc. In some instances, all nodes of a node pool may be located in the same location of a cloud, which may be the same datacenter, same region/zone within a datacenter, etc.

The master node 410 may be configured to manage workloads and resources of the worker nodes 420, 430. In this regard, the master node 410 may include various software components or processes that form part of a cluster's control plane. For instance, as shown, the master node 410 may include an API server 440, a database 470, a controller manager 480, and a scheduler 490 in communication with one another.

Although only one master node 410 is shown, the cluster 400 may additionally include a plurality of master nodes. For instance, the master node 410 may be replicated to generate a plurality of master nodes. The cluster 400 may include a plurality of cluster control plane processes. For example, the cluster 400 may include a plurality of API servers, a plurality of databases, etc. In such cases, a quorum of replica master nodes, such as a majority of the replica master nodes, must agree for the cluster 400 to modify any state of the cluster 400. Further, one or more load balancers may be provided on the cloud on which the cluster 400 is running for allocating requests, such as API calls, between the multiple API servers. The plurality of master nodes may improve performance of the cluster 400 by continuing to manage the cluster 400 even when one or more master nodes may fail. In some instances, the plurality of master nodes may be distributed onto different physical and/or virtual machines.

The API server 440 may be configured to receive requests, such as incoming API calls from a user application or from workloads running on the worker nodes, and manage the worker nodes 420, 430 to run workloads for handling these API calls. As shown, the API server 440 may include multiple servers, such as a built-in resource server 460 and an extensions server 462. Further as shown, the API server 440 may include an aggregator 450 configured to route the incoming requests to the appropriate server of the API server 440. For instance, when an API call comes in from a user application, the aggregator 450 may determine whether the API call is to be handled by a built-in resource of the cloud, or to be handled by a resource that is an extension. Based on this determination, the aggregator 450 may route the API call to either the built-in resource server 460 or the extension server 462.

The API server 440 may configure and/or update objects stored in the database 470. The API server 440 may do so according to a schema, which may include format that API objects in the cluster must conform to in order to be understood, served, and/or stored by other components of the cluster, including other API servers in the cluster. The objects may include information on containers, container groups, replication components, etc. For instance, the API server 440 may be configured to be notified of changes in states of various items in the cluster 400, and update objects stored in the database 470 based on the changes. As such, the database 470 may be configured to store configuration data for the cluster 400, which may be an indication of the overall state of the cluster 400. For instance, the database 470 may include a number of objects, the objects may include one or more states, such as intents and statuses. For example, the user may provide the configuration data, such as desired state(s) for the cluster 400.

The API server 440 may be configured to provide intents and statuses of the cluster 400 to a controller manager 480. The controller manager 480 may be configured to run control loops to drive the cluster 400 towards the desired state(s). In this regard, the controller manager 480 may watch state(s) shared by nodes of the cluster 400 through the API server 440 and make changes attempting to move the current state towards the desired state(s). The controller manager 480 may be configured to perform any of a number of functions, including managing nodes (such as initializing nodes, obtain information on nodes, checking on unresponsive nodes, etc.), managing replications of containers and container groups, etc.

The API server 440 may be configured to provide the intents and statuses of the cluster 400 to the scheduler 490. For instance, the scheduler 490 may be configured to track resource use on each worker node to ensure that workload is not scheduled in excess of available resources. For this purpose, the scheduler 490 may be provided with the resource requirements, resource availability, and other user-provided constraints and policy directives such as quality-of-service, affinity/anti-affinity requirements, data locality, and so on. As such, the role of the scheduler 490 may be to match resource supply to workload demand.

The API server 440 may be configured to communicate with the worker nodes 420, 430. For instance, the API server 440 may be configured to ensure that the configuration data in the database 470 matches that of containers in the worker nodes 420, 430, such as containers 421, 423, 425, 431, 433, 435. For example as shown, the API server 440 may be configured to communicate with container managers of the worker nodes, such as container managers 422, 432. The container managers 422, 432 may be configured to start, stop, and/or maintain the containers based on the instructions from the master node 410. For another example, the API server 440 may also be configured to communicate with proxies of the worker nodes, such as proxies 424, 434. The proxies 424, 434 may be configured to manage routing and streaming (such as TCP, UDP, SCTP), such as via a network or other communication channels. For example, the proxies 424, 434 may manage streaming of data between worker nodes 420, 430.

Figure 5:
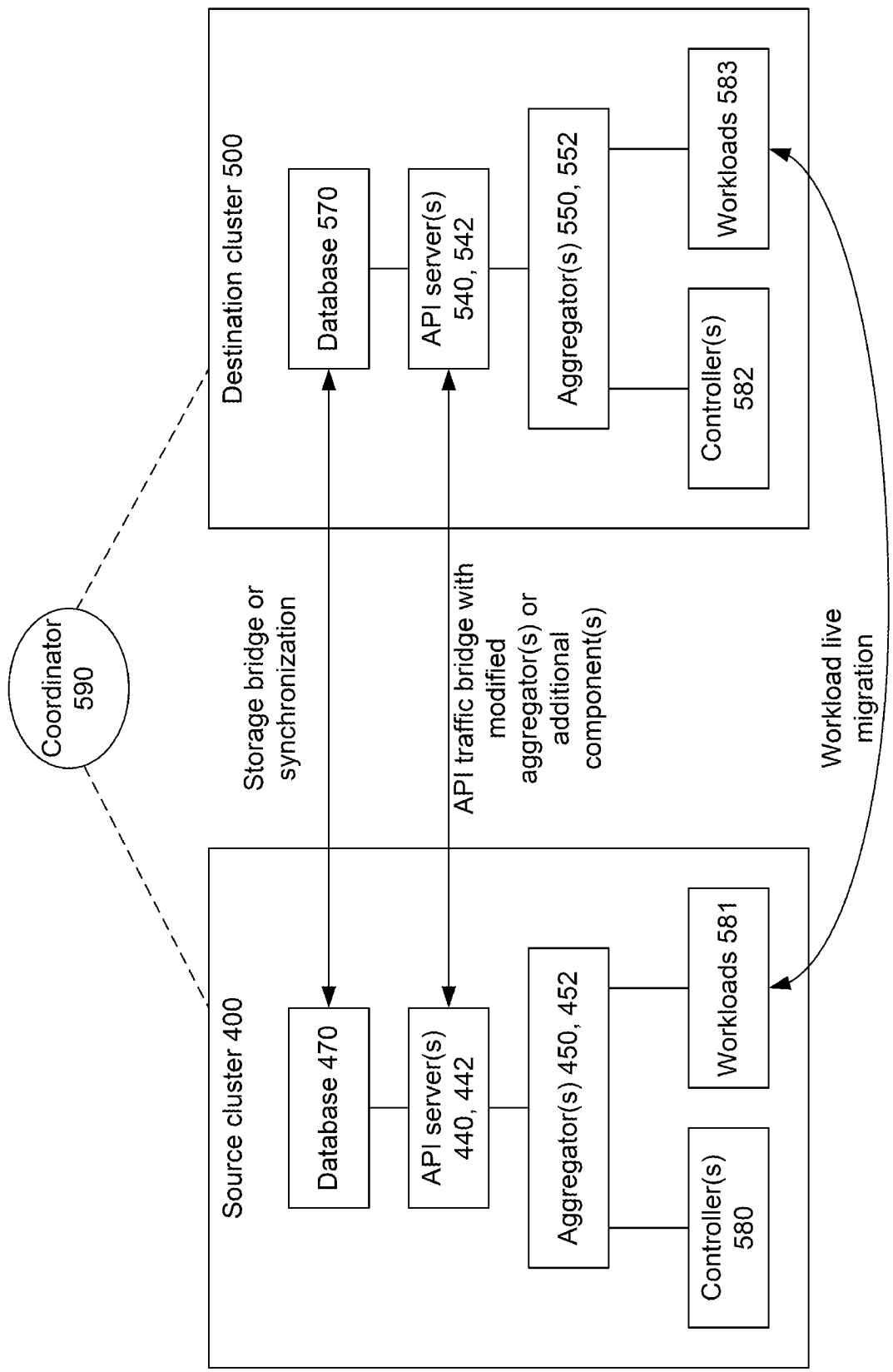
FIG. 5 shows example components involved in live cluster migration in accordance with aspects of the disclosure.

FIG. 5 shows some example components of two clusters involved in live migration. FIG. 5 shows a first cluster 400 as a source cluster from which objects are to be migrated, and a second cluster 500 as a destination cluster to which objects are to be migrated. FIG. 5 further shows both cluster 400 and cluster 500 with replicated master nodes, hence cluster 400 and cluster 500 are both shown with multiple API servers 440, 442, 540, 542 and corresponding aggregators 450, 452, 550, 552. Although only two replicas are shown in FIG. 5 for ease of illustration, it should be appreciated that any of a number of replicas may be generated.

Figure 1B:
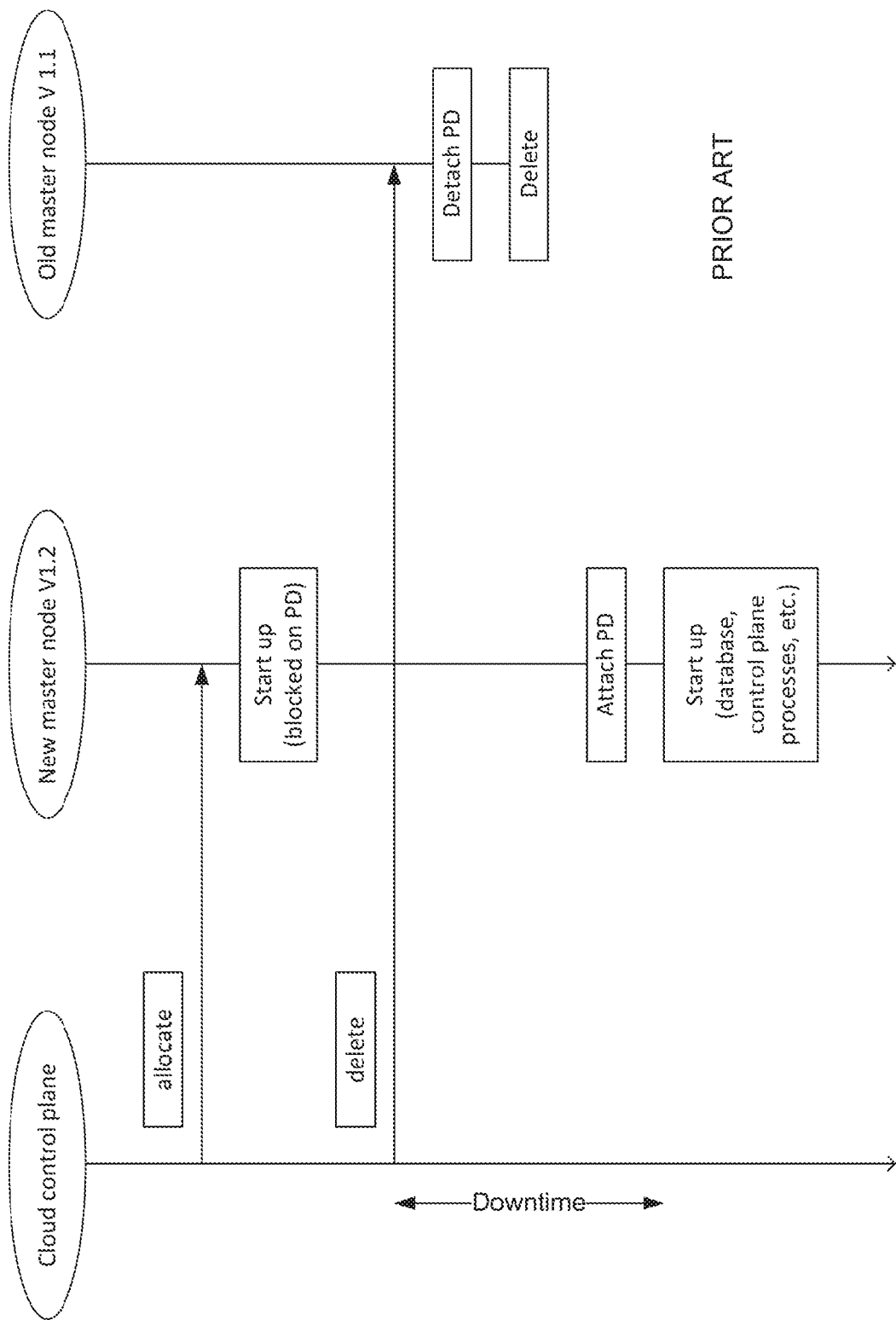

Destination cluster 500 runs in a different environment as source cluster 400. As described above in relation to FIG. 3, the different environments may be different software versions, different physical locations of datacenters, different networks, different cloud control planes on different clouds, etc. Instead of deleting a source cluster and creating a destination cluster to change the environment such as shown in FIGS. 1A-B, the change of environment can be performed by a live migration of various objects from the source cluster 400 to the destination cluster 500, while both clusters 400 and 500 are still running.

During the live migration, requests to the cluster control plane may be allocated between the source cluster 400 and the destination cluster 500. For example, traffic such as API calls may be allocated between API servers 440, 442 of the source cluster 400 and API servers 540, 542 of the destination cluster 500. As described in detail below, this may be accomplished by modifications to the aggregators 450, 452, 550, 552 (see FIG. 6), or by adding a component that intercepts API traffic (see FIG. 7). Further, to handle the API calls routed to cluster 400, cluster 400 may run controllers 580 to manage resources in cluster 400, such as managing replication of worker nodes and objects. Likewise, to handle API calls routed to cluster 500, cluster 500 may run controllers 582 to manage resources in cluster 500.

Further as described in detail below, live migration between clusters 400 and 500 may include handling objects stored for the cluster control plane in database 470 and database 570. For example, if clusters 400 and 500 are in the same datacenter and thus share the same storage backend, database 470 and database 570 may be bridged. On the other hand, if cluster 400 and cluster 500 are on different locations or clouds such that they do not have access to each other's storage backend, database 470 and database 570 may need to be synchronized (see FIG. 8).

In addition to migration for the cluster control plane, a live migration may be performed for workloads running in the clusters, such as workloads 581 running on the source cluster 400 and workloads 583 running on the destination cluster. Requests to workloads, such as API calls to workloads, may also be routed between the source cluster 400 and the destination cluster 500, for example by using a global load balancer (see FIG. 9). Further, the location of the storage for workloads may need to be changed for a migration across different locations or different clouds (see FIG. 10).

Further as shown in FIG. 5, a coordinator 590 may be provided, for example by the cloud provider for cloud 310, which includes various rules for implementing the live migration. In this regard, if the migration is within the same cloud, such as cloud 310, both the source cluster 400 and the destination cluster 500 may perform the migration based on the rules set in the coordinator 590. On the other hand, if the migration is between two different clouds, such as cloud 310 and cloud 320, in some instances only the cluster in the same cloud as the coordinator 590 might be able to follow the rules set in the coordinator 590. For example, the destination cluster 500 may be on cloud 310 and able to perform live migration based on the rules set in the coordinator 590; while the source cluster 400 may be on cloud 320 that is self-managed or managed by a different cloud, and may not have necessary features for following the rules set in the coordinator 590. As such, cloud 310 may include additional features to facilitate a migration from or to cloud 320.

Figure 6:
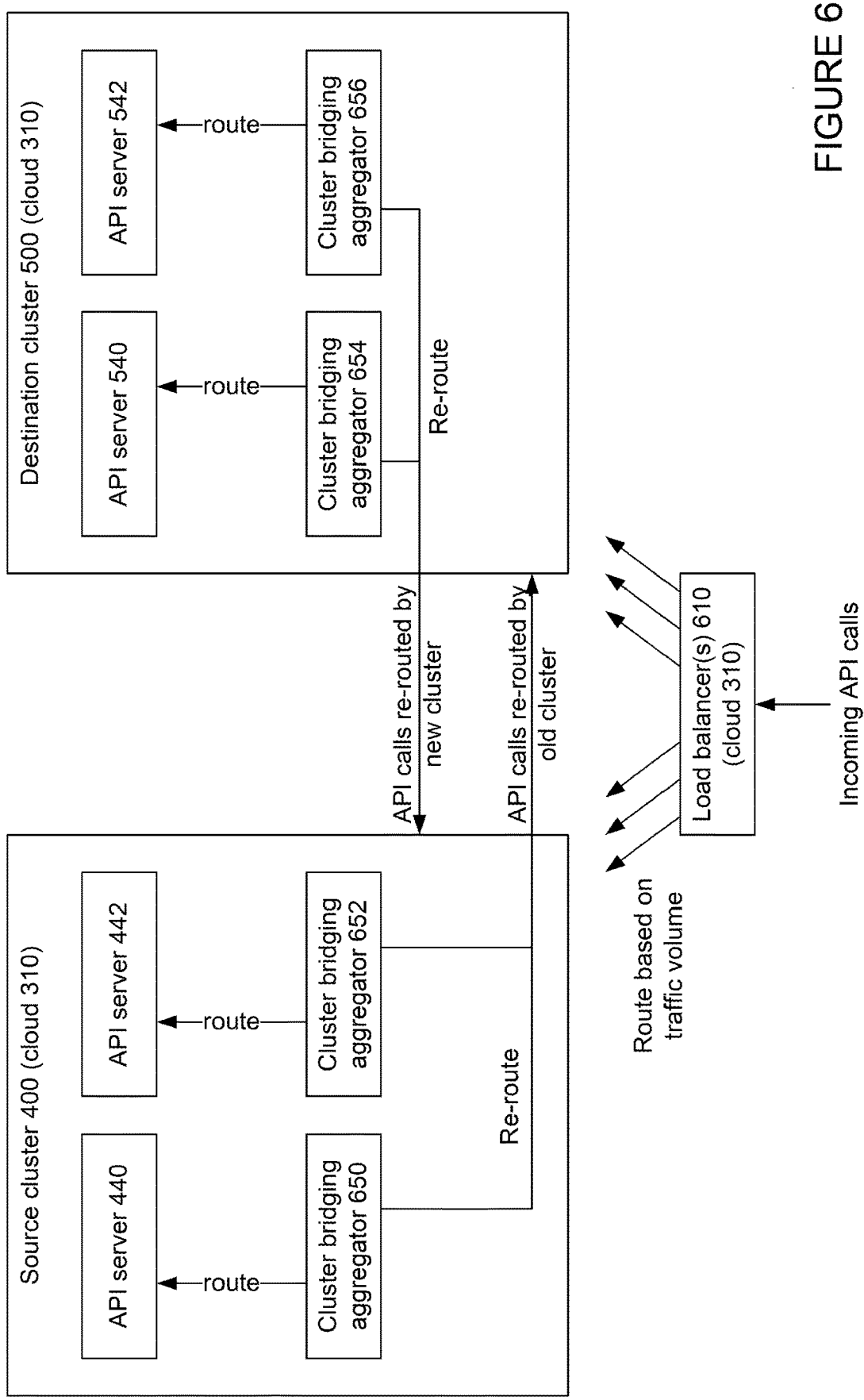
FIG. 6 illustrates example features routing requests for cluster control planes during a live migration within a cloud in accordance with aspects of the disclosure.

With respect to live migration of a cluster control plane, FIG. 6 illustrates example cluster bridging aggregators configured to route requests, such as API calls, between control planes of two clusters during a live migration within the same cloud. FIG. 6 shows a first cluster 400 as a source cluster from which objects are to be migrated, and a second cluster 500 as a destination cluster into which objects are to be migrated. In this example, both source cluster 400 and destination cluster 500 are hosted on the same cloud, such as cloud 310. FIG. 6 further shows both cluster 400 and cluster 500 with replicated master nodes, hence cluster 400 and cluster 500 are both shown with multiple API servers 440, 442, 540, 542 and corresponding cluster bridging aggregators 650, 652, 650, 652.

One or more load balancers may be configured to allocate incoming requests, such as API calls, between the various API servers based on traffic volume. For instance, a load balancer may be associated with all the API servers of a cluster, such as by network addresses of the API servers. However, the load balancer may be configured to provide client(s) of the cluster, such as application(s) run by the cluster, a single network address for sending all API calls. For example, the single network address may be a network address assigned to the load balancer. As the load balancer receives incoming API calls, the load balancer may then route the API calls based on traffic volume. For example, the load balancer may divide the API calls among the API servers of the cluster, and send the API calls based on the network addresses of the API servers.

Further as shown, the aggregators in the source cluster 400 and destination cluster 500 are both modified into cluster bridging aggregators 650, 652, 654, 656. The cluster bridging aggregators 650, 652, 654, 656 are configured to receive the incoming requests, such as API calls, from the load balancer 610, and further route requests to the API servers 440, 442, 540, 542. For example, control plane of the cloud 310, for example through coordinator 590, may notify the cluster bridging aggregators 650, 652, 654, 656 when migration is initiated. Once the cluster bridging aggregators 650, 652, 654, 656 become aware of the migration, the cluster bridging aggregators 650, 652, 654, 656 may determine whether the incoming API calls should be handled by the source cluster 400 or the destination cluster 500. Based on this determination, the cluster bridging aggregators 650, 652, 654, 656 may route the API calls to the appropriate API servers.

For instance, if an API call arrives at cluster bridging aggregator 650 of the source cluster 400, the cluster bridging aggregator 650 may determine whether the API call should be handled by the API servers of the source cluster 400, or the API servers of the destination cluster 500. If the cluster bridging aggregator 650 determines that the API call is to be handled by the API servers of the source cluster 400, cluster bridging aggregator 650 may route the API call to the corresponding API server 440. Otherwise, the cluster bridging aggregator 650 may re-route the API call to the API servers of the destination cluster 500. Likewise, if an API call arrives at cluster bridging aggregator 654 of the destination cluster 500, the cluster bridging aggregator 654 may determine whether the API call should be handled by the destination cluster 500, or the source cluster 400. If the cluster bridging aggregator 654 determines that the API call is to be handled by the destination cluster 500, cluster bridging aggregator 654 may route the API call to the corresponding API server 540. Otherwise, the cluster bridging aggregator 654 may route the API call to the API servers of the source cluster 400. Because the API servers of the source cluster 400 and the API servers of the destination cluster 500 may implement different schema for objects they handle, changes in API traffic allocation may effectively change the portion of objects conforming to the schema of the destination cluster 500.

The cluster bridging aggregators 650, 652, 654, 656 may route or re-route API calls based on any of a number of factors. For example, the routing may be based on a resource type, such as pods, services, etc. For instance, the cluster bridging aggregators 650, 652 may route API calls for all pods to the API servers 440, 442 in the source cluster 400, and re-route API calls for all services to the destination cluster 500. The routing may alternatively be based on object type. For instance, cluster bridging aggregators 650, 652 may route 50% of API calls for pod objects to the API server 440, 442 in the source cluster 400, and re-route the rest to the destination cluster 500. As another alternative, routing may be based on physical location of a resource. For example, cluster bridging aggregators 650, 652 may route 30% of API calls for pods in a particular datacenter, and re-route the rest to the destination cluster 500. Other example factors may include user-agent, user account, user group, location of a sender of the request, etc. The factors for API call routing may be set in the coordinator 590 by the cloud provider for cloud 310.

The cluster bridging aggregators 650, 652, 654, 656 may route or re-route API calls in a staged manner. For example, cluster bridging aggregators 654, 656 may start routing API calls for one resource type to API servers 540, 542 of the destination cluster 500 in one stage, and then changes to include API calls for another resource type to the API servers 540, 542 of the destination cluster 500 in a next stage, and so on. Alternatively, cluster bridging aggregators 654, 656 may start routing API calls for one physical location to API servers 540, 542 of destination cluster 500 in one stage, and then changes to include routing API calls for another physical location to API servers 540, 542 of destination cluster 500 in a next stage, and so on. As another example, cluster bridging aggregators 654, 656 may route API calls to the API servers 540, 542 in increasing proportions, such as routing API calls for 10% of pod objects to API servers 540, 542 of the destination cluster 500 in one stage, and routing API calls for 20% of pod objects to API servers 540, 542 of the destination cluster 500 in a next stage, and so on. The stages of API call routing may be set in the coordinator 590 by the cloud provider for cloud 310.

To determine whether to route or re-route a request, the cluster bridging aggregators 650, 652, 654, 656 may be provided with information on the allocations to be made. For instance, the cluster bridging aggregators 650, 652, 654, 656 may be configured to access one or more databases, such as database 570 of the destination cluster 500, for the fraction of traffic to be allocated to the source cluster 400 and to the destination cluster 500. As such, when an API call arrives for example at cluster bridging aggregator 654, the cluster bridging aggregator 654 may compute a hash value for the API call based on the faction ($0<F<1$) of API calls to be allocated to the destination cluster 500. The hash value may be further computed based on other information of the API call, such as IP address of the source of the API call and metadata of the API call. Such information may be used to determine resource type, object type, physical location, etc., that are relevant in the staged rollout process described above. In some examples, the hash value may also be interpreted as a numeric value p that is a fraction between 0 and 1. If $p<F$, then the cluster bridging aggregator 654 may route the API call to the destination cluster 500, otherwise, the cluster bridging aggregator 654 may route the API call to the source cluster 400. Decisions made based on the hash values may be defined deterministically so that no matter which cluster bridging aggregator involved in the migration receives the API call, it will make the same decision as the other cluster bridging aggregators. As such, there will not be a need to re-route an API call more than once. In some instances, during transitions in the staged rollout described above, different fractions F may be set, for example different resources, different physical locations, etc.

Additionally, the cluster bridging aggregators may further be configured to allocate other resources between the two clusters. For example, the destination cluster 500 may use different controllers to run control loops as compared to controllers used by the source cluster 400. As such, switching between the controllers of the source cluster and controllers of the destination cluster may also be performed in a staged rollout. For instance, to ensure that inconsistent changes are not made to objects, controllers may acquire locks before manipulating the objects. As such, the cluster bridging aggregators 650, 652, 654, 656 may be configured to allocate controller locks between the controllers of the source cluster 400 and the controllers of the destination cluster 500. The allocation may also be performed in predetermined stages, which may also be canaried.

Together, the API servers 440, 442, 540, 542, and cluster bridging aggregators 650, 652, 654, 656 in FIG. 6 essentially form a logical API service. Clients of this logical API service may thus send requests to this logical API service, and the requests will be routed by the various cluster bridging aggregators and handled by the various API servers. To the clients, there may be no observable difference other than possible latency.

Figure 7:
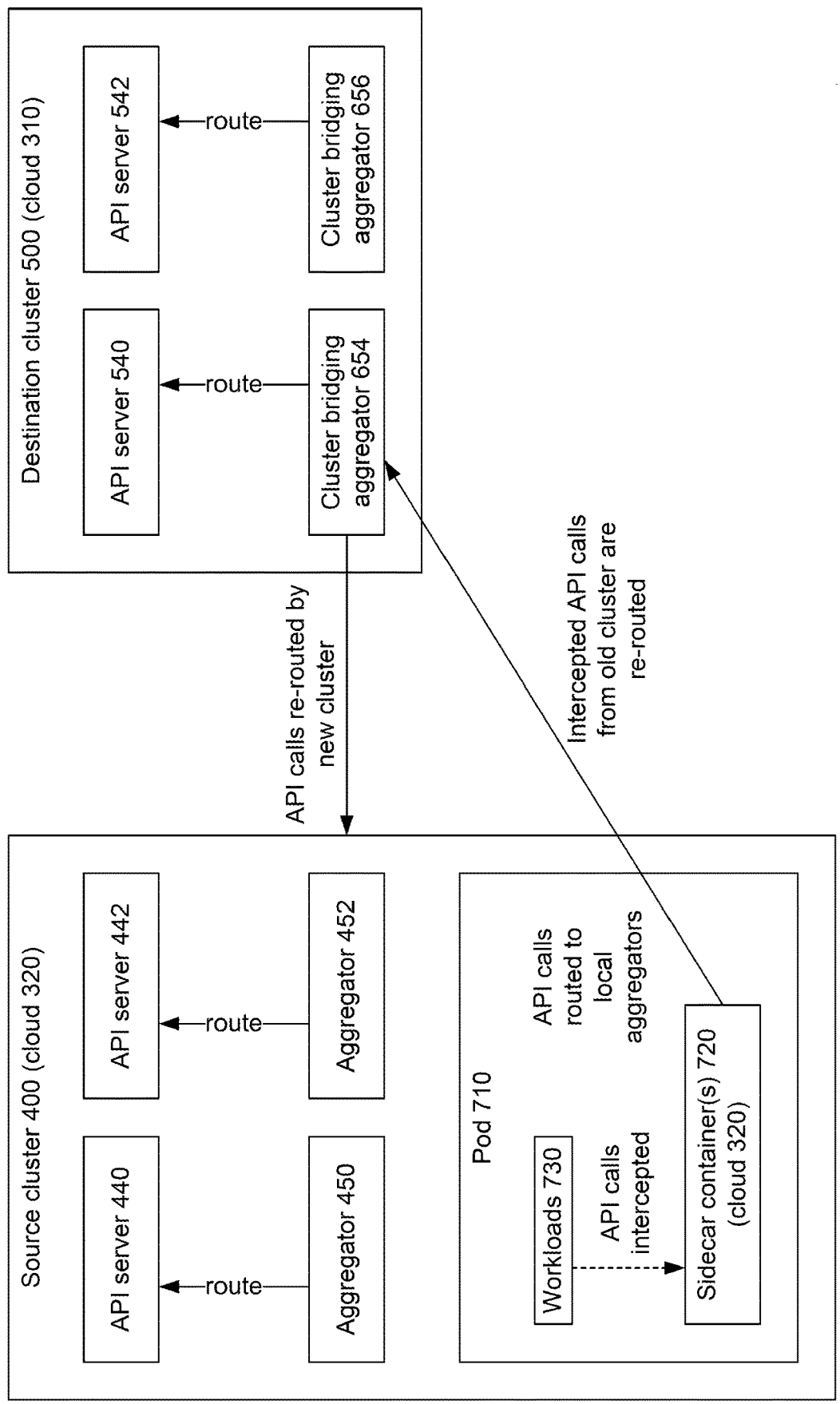
FIG. 7 illustrates example features routing requests for cluster control plane during a live migration between different clouds in accordance with aspects of the disclosure.

However, if the first, source cluster 400 and the second, destination cluster 500 are hosted on different clouds, one of the source cluster 400 or the destination cluster 500 may not be provided with cluster bridging aggregators, FIG. 7 illustrates an additional component intercepting requests, such as API calls, to the cluster control plane when performing a live cluster migration between two different clouds. In this example shown, destination cluster 500 is on cloud 310 configured to perform live migration, while source cluster 400 is on cloud 320 that is self-managed or managed by a different cloud provider that is not configured to perform live migration. As such, the destination cluster 500 on cloud 310 is provided with cluster bridging aggregators 654, 656 as described above, while the source cluster 400 on cloud 320 is provided with aggregators 450, 452 that cannot route and re-route API calls between clusters.

Since the two clusters here are on different clouds, requests, such as API calls, will not be received through the same load balancer 610 as shown in FIG. 6. Rather, API calls will be routed to the cluster bridging aggregators in the source cluster 400 and the destination cluster 500, based on their different network addresses, such as IP addresses.

Further as shown in FIG. 7, since cluster 400 does not include cluster bridging aggregators, sidecar containers may be injected into pods on cloud 320 for intercepting requests, such as API calls directed to the API servers locally in the cluster 400, and re-routing them to the cluster bridging aggregators 654, 656 in the destination cluster 500. For example, the sidecar containers may be injected by an extension the user installs on the cloud control plane of cloud 320. The sidecar containers may be injected into every workload pod running in the source cluster 400. For example as shown, sidecar container 720 is injected into pod 710 in cluster 400. The sidecar container 720 may be configured to intercept API calls from the workloads 730 running in pod 710, which are directed to API server 440 or 442, and simulate the cluster bridging aggregator which is absent from source cluster 400. It does this simulation simply by redirecting these API calls to the cluster bridging aggregators 654, 656 in the destination cluster 500. The cluster bridging aggregators 654, 656 may then determine whether these API calls shall be handled locally by API server 540, 542, or if it should be sent back to the source cluster's API servers 440, 442. The cluster bridging aggregators 654, 656 may make determinations as discussed above in relation to FIG. 6, and route the API calls accordingly.

Together, the API servers 440, 442, 540, 542, aggregators 450, 452, sidecar container 712, cluster bridging aggregators 654, 656 in FIG. 7 essentially form a logical API service. Clients of this logical API service may thus send requests to this logical API service, and the requests may be intercepted by the sidecar container 720, and/or routed by the various cluster bridging aggregators, and handled by the various API servers. To the clients, there may be no observable difference other than possible latency.

As alternatives to injecting a sidecar container as described above, other components or processes may be used to intercept and re-route requests. For example, domain name service (DNS) entries may be injected into the nodes for re-routing to the cluster bridging aggregators of the destination cluster.

Returning to FIG. 5, with respect to storage for the cluster control plane, in instances where the source cluster 400 and destination cluster 500 are on the same cloud and within the same datacenter, database 570 may join the same quorum as database 470. As such, the quorum of databases including the database 470 or database 570 must reach an agreement before objects are to be modified or written into any of the quorum of databases. For example, an agreement may be reached when a majority of the database replicas agree to the change. This ensures that database 570 and database 470, and their replicas, reflect consistent changes. In some examples, database 570 may join at first as non-voting member of the database quorum, and later becomes a voting member of the quorum.

Figure 8:
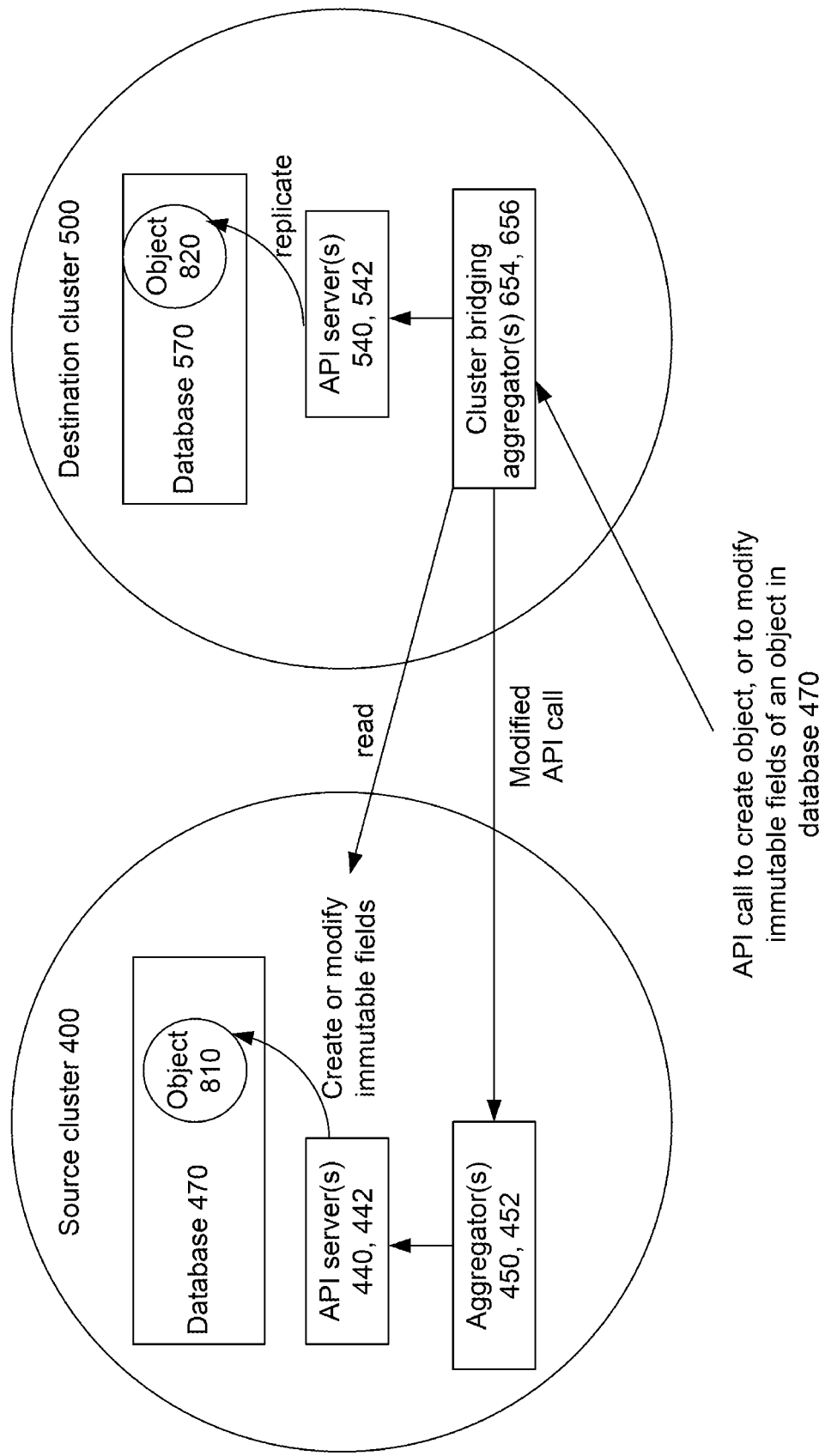
FIG. 8 illustrates example features performing storage synchronization for cluster control plane during live migration between different locations or clouds in accordance with aspects of the disclosure.

However, if the source cluster 400 and the destination cluster 500 are not on the same cloud or same datacenter, database 570 may not be able to join the quorum of database 470. As such, FIG. 8 illustrates example cluster control plane storage synchronization during live migration for clusters on different clouds and/or regions. For example, a first, source cluster 400 may be on cloud 320 and a second, destination cluster 500 may be on cloud 310. As another example, destination cluster 500 may be in datacenter 260 and source cluster 400 may be on datacenter 270.

In a containerized environment, some fields of an object can only be modified by an API server and are otherwise immutable. Thus, once immutable fields of an object are written or modified by an API server of the source cluster 400, such as API server 440 or 442, API servers of the destination cluster 500, such as API server 540 or 542, may not be able to modify these fields as stored in the database 470 of the source cluster 400. Thus as shown, for example when an API call comes in at the cluster bridging aggregator 654 requesting a new object be created or immutable fields modified, the API call may be modified by the cluster bridging aggregator 654 and sent first to the source cluster 400, such as to aggregator 450. The API server 440 may create or modify object 810 stored in database 470 according to the modified API call.

The cluster bridging aggregator 654 may then use its local API server 540 to create its own copy of the object 810 in database 470, shown as object 820 in database 570. For instance, the cluster bridging aggregator 654 may read the immutable fields having the values chosen by the API server 440 of the source cluster 400, and write these values into object 820.

In some instances, the cluster bridging aggregator 654, 656 may block read-only operations for an object while write operations are in progress for that object to ensure that API callers see a consistent view of the world. Otherwise, API callers may observe only part of the changes performed, since as described above, making a write in this migrating environment may be a multi-step process. Additionally, API callers have expectations around the concurrency model of API server which need to be upheld for the process to be transparent to these callers.

Figure 9:
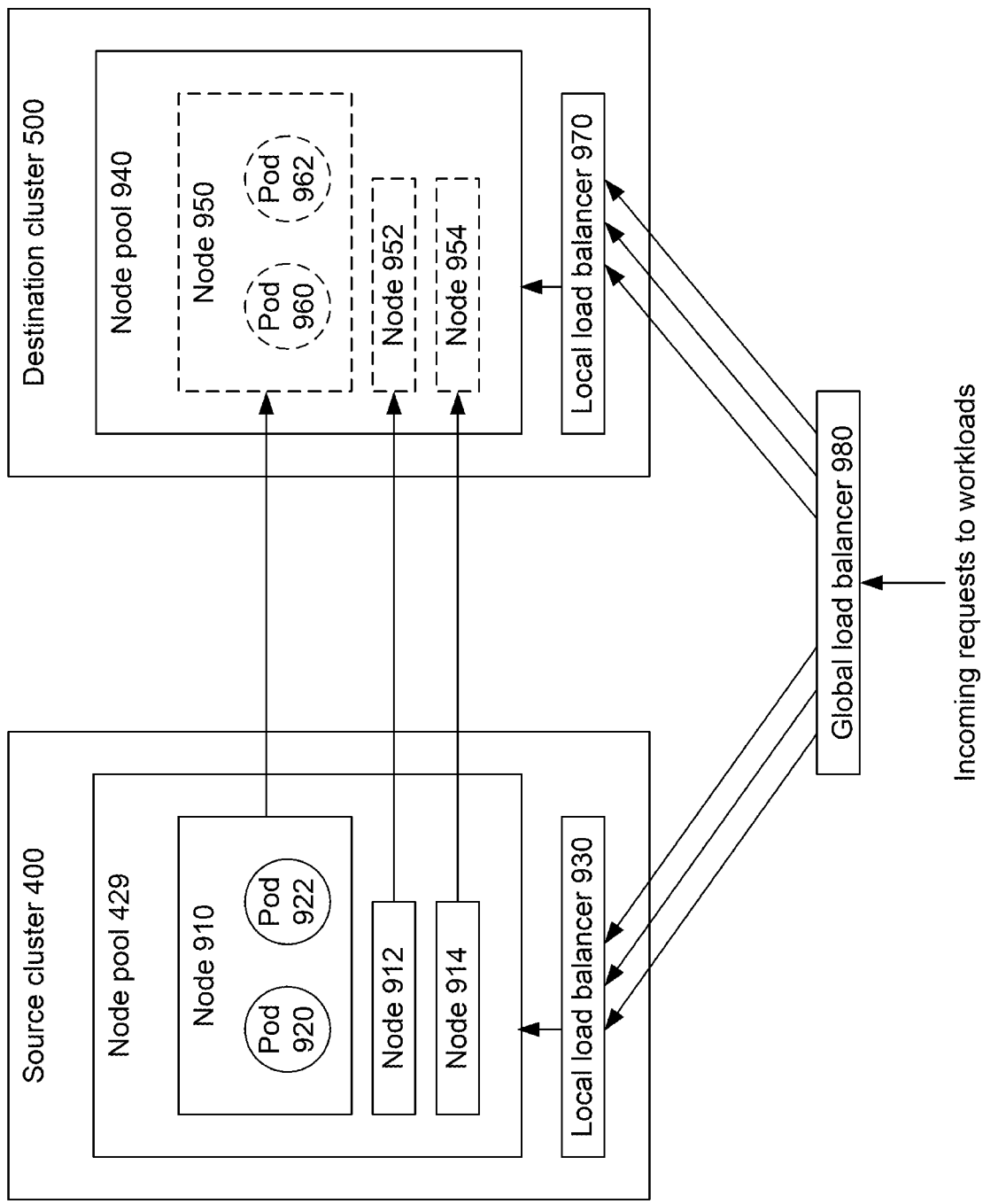
FIG. 9 illustrates example features for migration of workloads in accordance with aspects of the disclosure.

In another aspect, a migration may also be performed for workloads running in the clusters. FIG. 9 shows example features involved in performing workload migration. For instance, a first, source cluster 400 is shown with node pool 429, which includes nodes 910, 912, 914. One or more pods may be running in the nodes of cluster 400, such as pod 920 and pod 922 shown. Cluster 400 may further include a local load balancer 930 for allocating traffic to workloads in the cluster 400. For instance, requests from websites or applications served by the workloads may be received by the local load balancer 930, and the local load balancer 930 may allocate these requests to the various pods and nodes in node pool 429. For example, the websites or application served by the workloads of cluster 400 may be configured with domain name service (DNS) records associating the website or application to a network address of the local load balancer 930.

Further as shown, workloads within cluster 400 are to be migrated to a second, destination cluster 500. The cluster 500 may be initialized with a node pool 940 that does not have any node, and a local balancer 970 for allocating incoming requests to workloads once pods and nodes are created in the cluster 500. A migration may be performed for the node pool 429 from cluster 400 to cluster 500 within the same location, such as within the same datacenter or within the same region/zone of a datacenter, or it may be between different locations. The migration may also be performed within the same cloud or between different clouds. Although clusters 400 and 500 are shown with only one node pool, in practical examples the clusters 400 and 500 may include a plurality of node pools. In instances where a cluster does not already group nodes into node pools, during the migration each node may be treated as its own node pool, or nodes with similar sizes may be grouped together, etc.

Once the destination cluster 500 is initialized, the node pool 940 may gradually increase in size. For example, a new node 950 may be allocated in node pool 940. The new node 950 initially may not include any pods. In response to the increase in size of the node pool 940, the old node pool 429 may decrease in size. For example, old node 910 may be deleted. The allocation of new nodes and removal of old nodes may be performed by a cloud provider as instructed by the coordinator.

The cluster control plane of the source cluster 400 and/or the destination cluster 500 may be notified that node 910 is now missing, and register all the pods previously existing in node 910, such as pods 920 and 922 shown, as lost. As such, cluster control plane of the destination cluster 500 may create replacement pods in the new node pool 940. For instance, controllers of the destination cluster 500 may determine that new node 950 in node pool 940 has capacity, and may create replacement pods, such as replacement pods 960 and 962 shown, in the new node 950. Thus, effectively, the pods 920, 922 are moved into the second cluster as pods 960, 962. This may be repeated for other nodes in node pool 429, such as creating new nodes 952 and 954 in node pool 940 corresponding to nodes 912, 914 as shown, and replacing any missing pods, until node pool 429 no longer has any nodes and/or pods.

As an alternative to deleting node 910 and adding node 950 before moving any pods, a live migration may be performed. For instance, once new node 950 is created, node 910 may be "cordoned" such that new pods are prevented from being scheduled on node 910. Then, new pod 960 is created in node 950. The states of the pod 920 may be recorded and transmitted to pod 960. Then, executions of processes in pod 920 may be paused. If there had been any changes to pod 920 since recording the states, these changes may also be copied into pod 960. The paused executions may then resume in pod 960. Pod 920 may then be deleted. During this live migration, traffic directed to pod 920, such as requests to workloads, may be forwarded to pod 960, until pod 920 is deleted. For example, a load balancer may have directed requests to pod 920, before being aware of newly created pod 960. This may be repeated for each pod in the various nodes and node pools of source cluster 400, until there is no pod left.

Further, migration of the workloads may include, in addition to migration of the pods, also migration of the services to which the pods belong. Migration of the services may overlap with migration of the pods. For instance, once one or more pods are created in the destination cluster 500, services previously handled by pods of the source cluster 400 may be migrated to be handled by the pods in the destination cluster 500. Further, migration of the services may need to be completed before there is no more pods in the source cluster 400 to handle the services.

In this regard, one or more global load balancers may be created. For instance, once the workload node and pod migration is initiated but before any node is moved, the source cluster 400 and the destination cluster 500 may each be associated with one or more load balancers configured to route requests to workloads running in both the source cluster 400 and the destination cluster 500. For example as shown, both the local load balancer 930 and the local load balancer 970 may be associated with global load balancer 980. Thus, if the source cluster 400 and the destination cluster 500 are in different locations or clouds, the global load balancer 980 may be configured to route requests to these different locations or clouds. The websites or application previously served by the workloads of cluster 400 may be configured with DNS records associating the website or application to a network address of the global load balancer 980, instead of previously to the local load balancer 930. As such, once workload node and pod migration starts, requests from the website or application may be routed through the global load balancer 980 to both local load balancers 930 and 970.

Once workload node and pod migration is complete, association between the local load balancer 970 and the global load balancer 980 may be removed. Further, the websites or application previously served by both cluster 400 and cluster 500 may be configured with DNS records associating the website or application to a network address of the local load balancer 970. Thus, from this point on, local load balancer 970 may be configured to route requests from the website or application to only the workloads running in the destination cluster 500.

Figure 10:
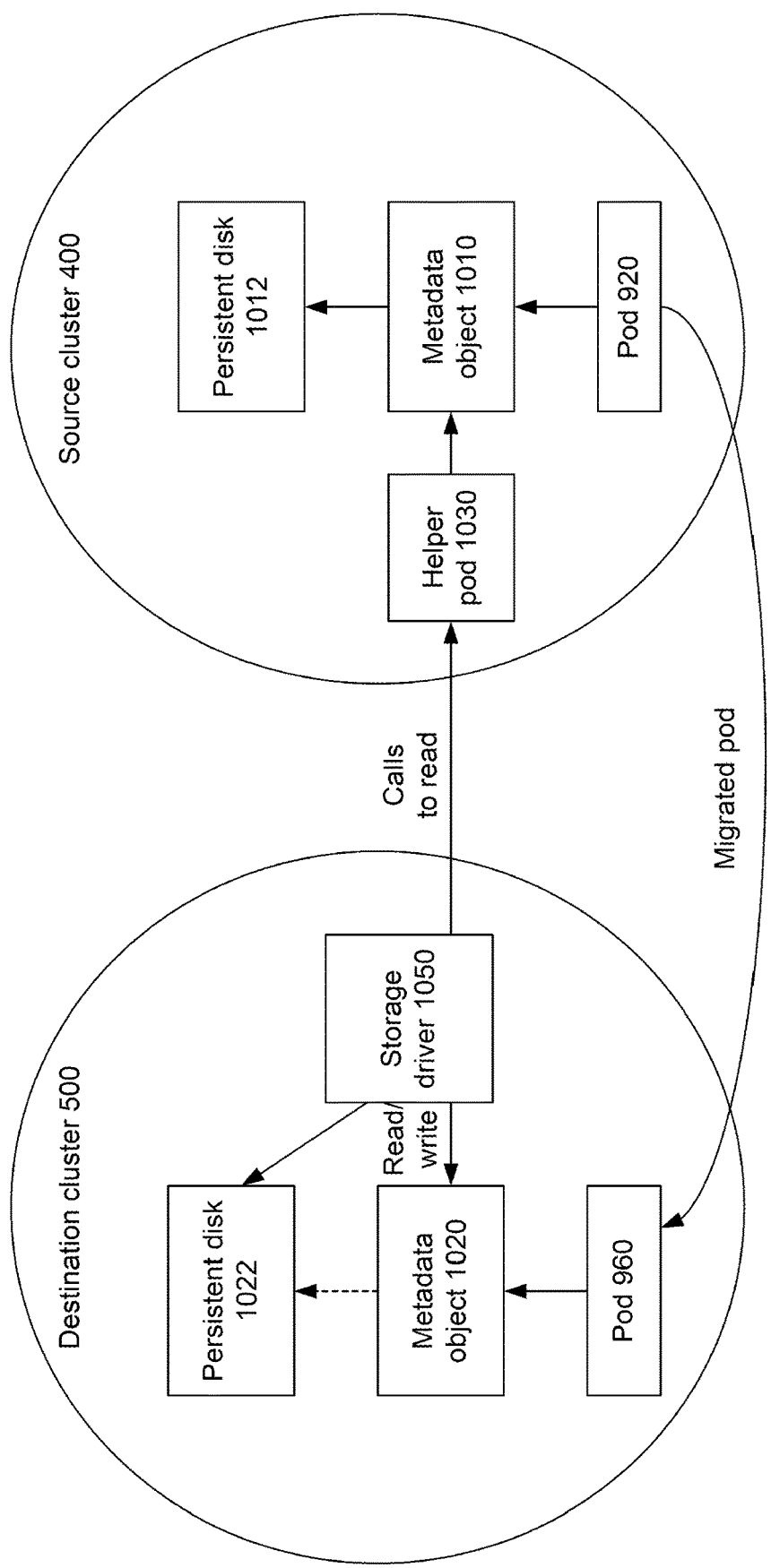
FIG. 10 illustrates example features performing live storage migration for workloads between different locations or clouds in accordance with aspects of the disclosure.

Still further, where migration of workloads as shown in FIG. 9 is between different locations or between different clouds, live migration of workload storage may need to be performed. FIG. 10 shows live workload storage migration between different locations or clouds. For instance, the live workload storage migration may occur simultaneously as the migration of pods as shown in FIG. 9. A storage system for a containerized environment may include various objects storing data. For example, the storage system may include persistent disks provided by a cloud provider, and metadata objects containing references. For instance, the metadata objects may be used to set up or "mount" persistent disk(s) for pods or containers. As some examples, the metadata objects may include persistent volumes that refer to data on the persistent disks, and persistent volume claims that refer to the persistent volumes and store information on usage of such data by containers or pods.

When the migration is between different locations or clouds, the metadata objects may be copied to a destination environment, but the persistent disk may not be copied to the destination environment. Thus, a live migration of the storage system for workloads may be performed by tracking locations of each persistent disk, duplicating the metadata objects in a destination environment, and using a copy-on-write system to copy over data.

For example as shown, while running in a first, source cluster 400, a pod 920 may have an already existing metadata object 1010, which may refer to a persistent disk 1012. To make effective copies of these storage objects, a helper pod 1030 may be created in the source cluster 400 and attached to the metadata object 1010. This helper pod 1030 may be configured to read from the persistent disk 1012 after the pod 920 migrates to a second, destination cluster 500 as pod 960.

The migrated pod 960 is then attached to a node in the destination cluster 500 and to a newly created metadata object 1020, which may be a duplicate of metadata object 1010. It may be determined that the metadata object 1020 of the migrated pod 960 includes references to the persistent disk 1012. To set up storage for the migrated pod 960, a storage driver 1050 may determine that the persistent disk 1012 is in a different cluster. As such, a new persistent disk 1022 may be created in the destination cluster 500.

However, instead of being directly attached to the new persistent disk 1022, the pod 960 may initially perform reads and/or writes through the storage driver 1050, which may determine that the pod 960 and the metadata object 1020 are referring to persistent disks at two different locations. For example, the storage driver 1050 may be run as a plugin on the node 910 of FIG. 9. The storage driver 1050 may be configured to access both the old persistent disk 1012, for example, via network access to helper pod 1030, and the new persistent disk 1022.

For instance, to read, the pod 960 may use storage driver 1050 to read from the new persistent disk 1022. Additionally, the storage driver 1050 may also call the helper pod 1030, which may read from the persistent disk 1012.

In order to write, the pod 960 may also do so through the storage driver 1050. The storage driver 1050 may be configured to direct all writes to the persistent disk 1022. This way, any new changes are written into the new persistent disk 1022. Writing may be performed by copy-on-write, where changes are directly written into the new persistent disk 1022, while unchanged data are copied over from the old persistent disk 1012.

Further, a migration may be performed in the background to gradually move all data from storage objects in the source cluster 400 to the destination cluster 500. For example when the network is not busy, the storage driver 1050 may continue to read data from persistent disk 1012, and then write this data into persistent disk 1022. Once all the data are copied over, the persistent disk 1022 will contain the complete file system, and the pod 960 may be directly attached to the persistent disk 1022 without the storage driver 1050. The old persistent disk 1012 may be deleted. During this process, from the perspective of the pod 960, there is no difference other than possible latency.

Although FIG. 10 shows one metadata object between a pod and a persistent disk, in some examples there may be multiple metadata objects referring to one another forming a chain of references. For example, a pod may refer to a persistent volume claim, which may refer to a persistent volume, which may then refer to a persistent disk.

Example Methods

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 11A:
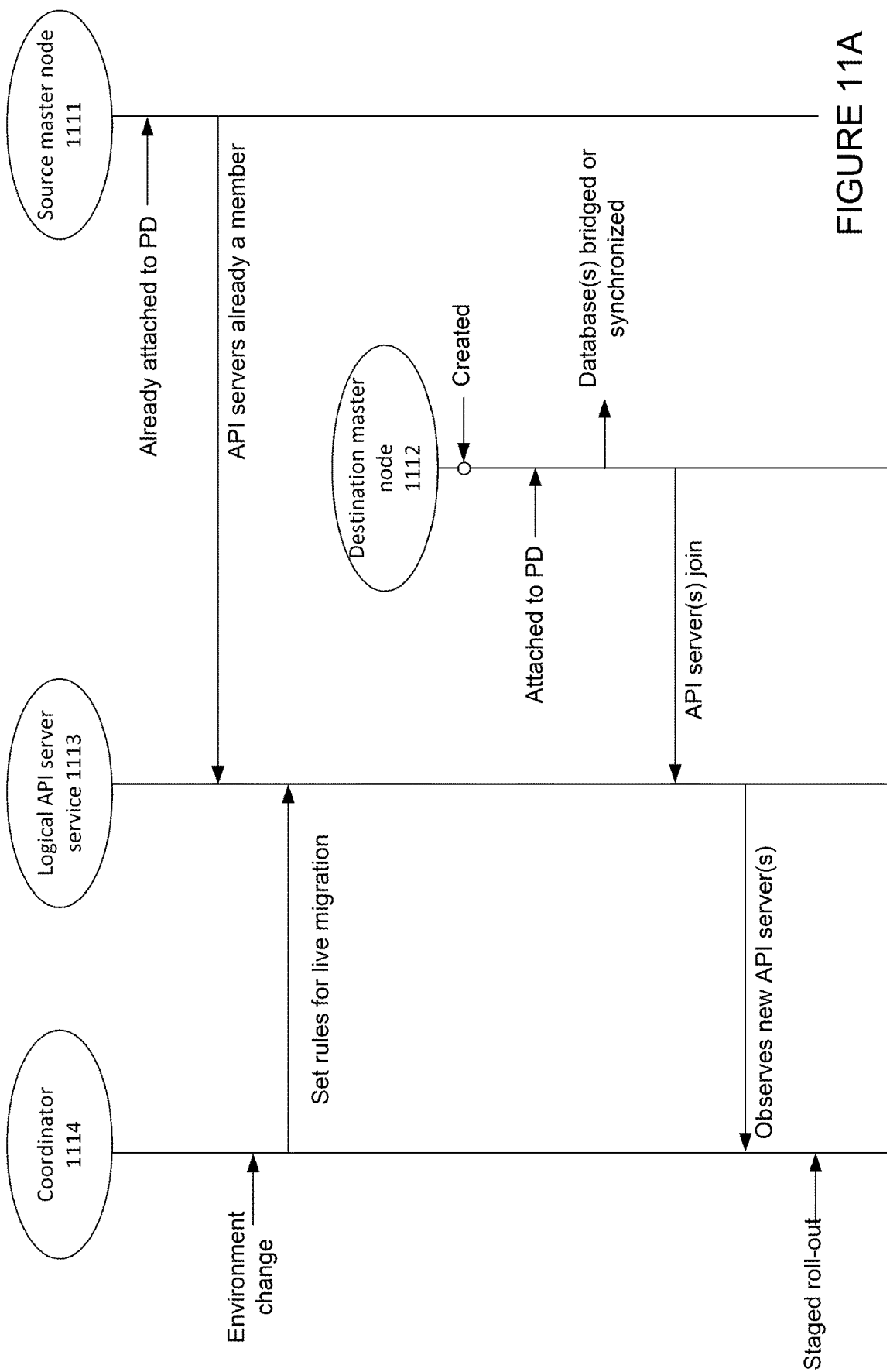
FIGS. 11A, 11B, and 11C are timing diagrams illustrating an example live migration for cluster control plane in accordance with aspects of the disclosure.
Figure 11B:
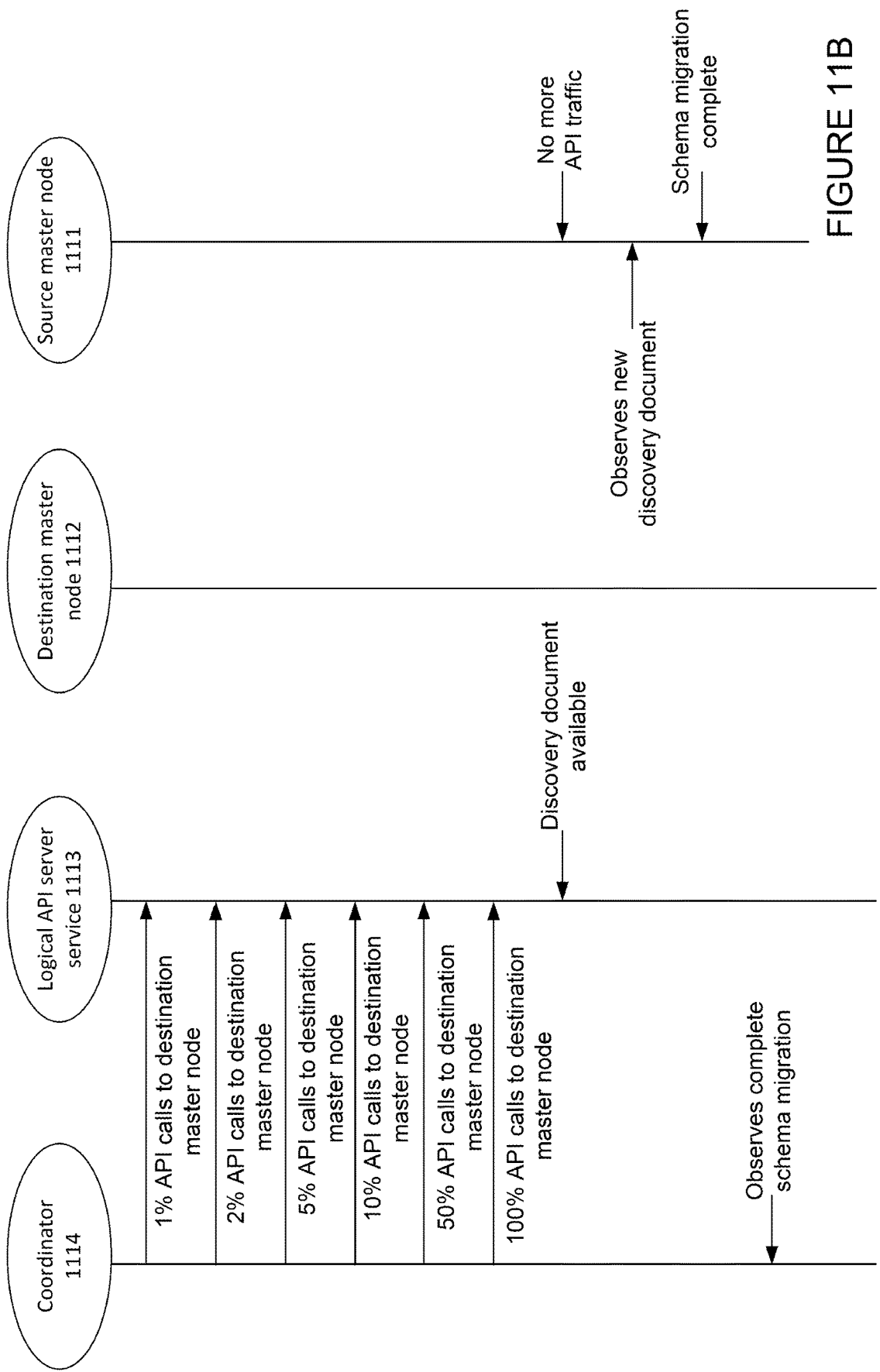
Figure 11C:
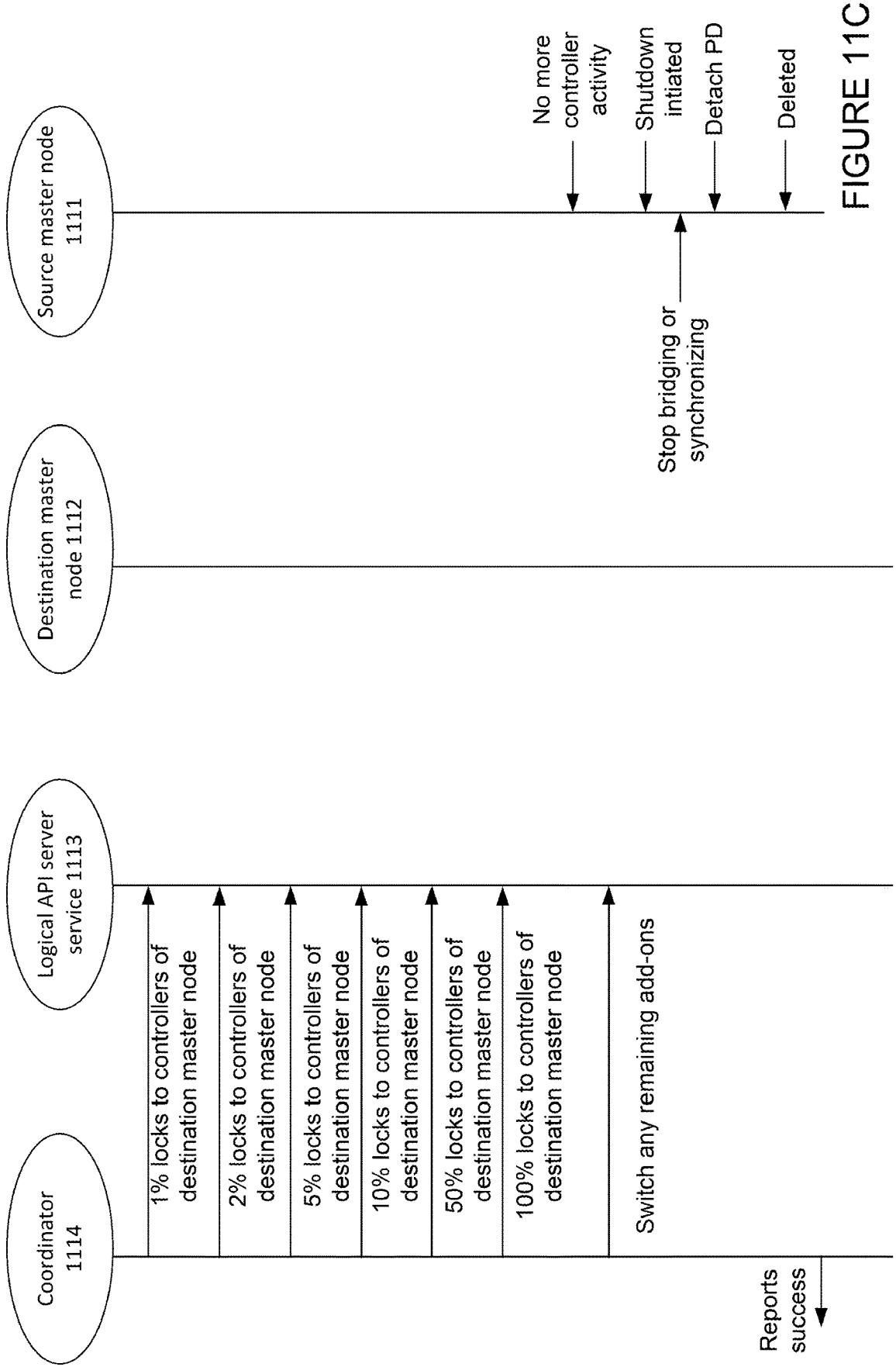

For instance, FIGS. 11A-C are timing diagrams illustrating an example live cluster migration for the cluster control plane. FIGS. 11A-C shows various actions occurring at a source master node 1111 in a first, source cluster, a destination master node 1112 in a second, destination cluster, a logical API service 1113, and a coordinator 1114. The source master node 1111 and destination master node 1112 may be configured as shown in any of FIGS. 4-7. Although only one source master node 1111 and only one destination master node 1112 are shown, there may be any number of master nodes in either or both of the source cluster and the destination cluster, such as shown in FIGS. 4-7. The logical API service 1113 may be a quorum of API servers for one or more clusters, which include aggregators and/or cluster bridging aggregators as shown in FIGS. 4-6, and/or sidecar containers as shown in FIG. 7. The timing diagram may be performed on a system, such as by one or more processors shown in FIG. 2 or FIG. 3.

Referring to FIG. 11A, initially, a source master node 1111 of a source cluster may already be running on a cloud. As such, the source master node 1111 is already attached to a PD, and API server(s) of the source master node 1111 may already be member(s) of the logical API service 1113.

At some point, a cloud provider of the cloud or a user may initiate an environment change, such as introducing a software upgrade, moving to a different datacenter, moving to/from a different cloud, etc. The cloud provider may further define rules for a live migration to implement the environment change in the coordinator 1114, and the coordinator 1114 may instruct the logical API service 1113 to implement the rules. For example, the rules may include factors for workload traffic allocation and stages of migration.

Once the environment change is initiated, a destination master node 1112 may be created and attached to a PD. To maintain consistent changes as the source master node 1111, one or more databases of the destination master node 1112 may be bridged or synchronized with the one or more database(s) of the source master node 1111. For example, in instances where the source master node 1111 and the destination master node 1112 are in the same cloud and location, database(s) of the destination master node 1112 may join the same quorum as the database(s) of the source master node 1111. In instances where the source master node 1111 and the destination master node 1112 are in different clouds or locations, database(s) of the destination master node 1112 may be synchronized to the database(s) of the source master node 1111 as shown in FIG. 8.

At this point the destination master node 1112 may begin running, while the source master node 1111 continues to run. As such, downtime is reduced or eliminated as compared to the process shown in FIGS. 1A and 1B. To simultaneously handle requests to the cluster control plane, such as API calls, API server(s) of the destination master node 1112 may join the logical API service 1113. For instance, the API server(s) of the destination master node 1112 may join the logical API service 1113 via cluster bridging aggregator(s) as shown in FIG. 6, or sidecar pod(s) may be created as shown in FIG. 7.

Once the coordinator 1114 observes the API server(s) of the destination master node 1112, the coordinator 1114 may begin a staged rollout to change the environment. Continuing to FIG. 11B, the timing diagram illustrates an example staged rollout of API traffic from the source cluster to the destination cluster. As shown, the coordinator 1114 may instruct the logical API service 1113 to implement a staged traffic allocation between API server(s) of the source master node 1111 and API server(s) of the destination master node 1112. The API traffic allocation may be implemented using cluster bridging aggregator(s) as shown in FIG. 6, and/or using one or more sidecar containers as shown in FIG. 7. Since API servers of the source cluster and the destination cluster may handle objects based on different schemas, the destination schema for objects in the destination environment is gradually rolled out as API traffic is increasingly routed to API server(s) of the destination master node 1112.

As shown in FIG. 11B, during the rollout stage, incoming API calls may be routed to API server(s) of the destination master node 1112 and the API server(s) of the source master node 1111 via the logical API service 1113. The coordinator 1114 may set predetermined proportions of API traffic allocation. In the particular example shown, initially 1% of the received API calls may be handled by API server(s) of the destination master node 1112 and remaining 99% of the received API calls may be handled by API server(s) of the source master node 1111. In other words, initially only 1% of API calls are handled by API server(s) of the destination master node 1112 according to the schema of the destination environment, the rest are handled by API server(s) of the source master node 1111 according to the schema of the source environment. In addition to or as alternative to allocating the API traffic by predetermined proportions, API traffic may be further allocated according to other criteria, such as by resource type, by user, by namespace, by object type, etc.

During the rollout process, activities in the API server(s) of the destination master node 1112 may be monitored. For instance, the coordinator 1114 may monitor activities of cluster control plane components, such as API servers, controller managers, etc. The coordinator 1114 may further monitor the workloads, such as comparing workloads handled by the source and destination clusters for problematic differences. As such, if no failure is detected with one proportion of API calls handled by the API server(s) of the destination master node 1112, or at least no additional failures that were not already occurring in the source cluster 400 prior to the migration, then API traffic to the API server(s) of the destination master node 1112 may be increased to a higher proportion, and so on. For example as shown, the API calls routed to the API server(s) of the destination master node 1112 may increase from 1% to 2%, 5%, 10%, etc. However, if one or more failures are detected in the proportion of API calls handled by the API server(s) of the destination master node 1112, the failure may act as a warning that more failures may result if a greater proportion of API calls are handled by the API server(s) of the destination master node 1112. Appropriate actions may be taken based on the warning, such as reverting all API traffic to the source API server as shown in FIG. 11.

Further as shown, in some instances a discovery document including information on the destination environment, such as the exact schema to be followed by objects, may be made available to a user only once the API server(s) of the destination master node 1112 handle all the incoming API calls. For example, as each type of object becomes fully handled by the destination cluster, a section in the discovery document for the corresponding type of object may be updated with destination schema for that type of object. In other words, end users may not be able to observe any environment change up until this point, when all objects are being handled by API server(s) of the destination master node 1112 based on the destination schema. At this point, there is no more API traffic received by the source master node 1111, and thus no object is being handled by the API server(s) of the source master node 1111 based on the old schema. Control plane of the source master node 1111 may also observe the new discovery document, and is notified that the schema migration is complete.

Once the coordinator 1114 observes the completed schema migration, the coordinator 1114 may optionally begin a staged rollout for one or more other aspects of the clusters. For example, continuing to FIG. 11C, the timing diagram illustrates an example staged rollout for controllers. In some instances, an environment change may involve change in controllers that actuate objects of a cluster. For example, the destination master node 1112 in the destination environment may use different controllers to run control loops as compared to the controllers used by the source master node 1111. As such, switching between the controllers of the source master node 1111 and the controllers of the destination master node may also be performed in a staged rollout. For instance, to ensure that inconsistent changes are not made to objects, controllers may acquire locks before manipulating the objects. As such, the coordinator 1114 may instruct the logical API service 1113 to implement a staged controller lock allocation between controllers of the source cluster and controllers of the destination cluster.

Thus in the particular example shown in FIG. 11C, initially only 1% of controller locks are given to the controllers of the destination master node 1112, the rest of the controller locks are given to the controllers of the source master node 1111. As with rollout of API servers, the coordinator 1114 may monitor activities of cluster control plane components, such as API servers, controller managers, and/or workloads for any failure due to switching to the controllers of the destination master node 1112. If no failure is detected, or at least no additional failures that were not already occurring in the source cluster 400 prior to the migration, the proportion of controller locks given to the controllers of the destination master node 1112 may be gradually increased. Further, to ensure no object is manipulated by two controllers while adjustments are made to the controller lock allocation, such as going from 1% lock to 2% lock allocation, the controllers may be configured to maintain the locks on the objects they already control in the previous stage. Eventually, all controller locks may be given to the controllers of the destination master node 1112, and at that point, there is no more controller activity at the source master node 1111.

At this point, optionally the coordinator 1114 may switch any other remaining add-ons. For example, objects may be handled by add-on components of the destination master node 1112, instead of add-on components of the source master node 1111. Example add-on components may include a user interface, such as a dashboard, a Domain Name System (DNS) server, etc. Optionally, the add-on components may be switched in the staged rollout as described above for API servers and controllers.

Once the rollout from the source environment to the destination environment is completed, a shutdown process may begin for the source master node 1111. For instance, any bridging, synchronization, or migration of databases between the source master node 1111 and the destination master node 1112 may be stopped. Further, PD may be detached from the source master node 1111, and the source master node 1111 may then be deleted. Once the source master node 1111 is destroyed, the coordinator 1114 may report the successfully completed migration to the cloud.

Figure 12:
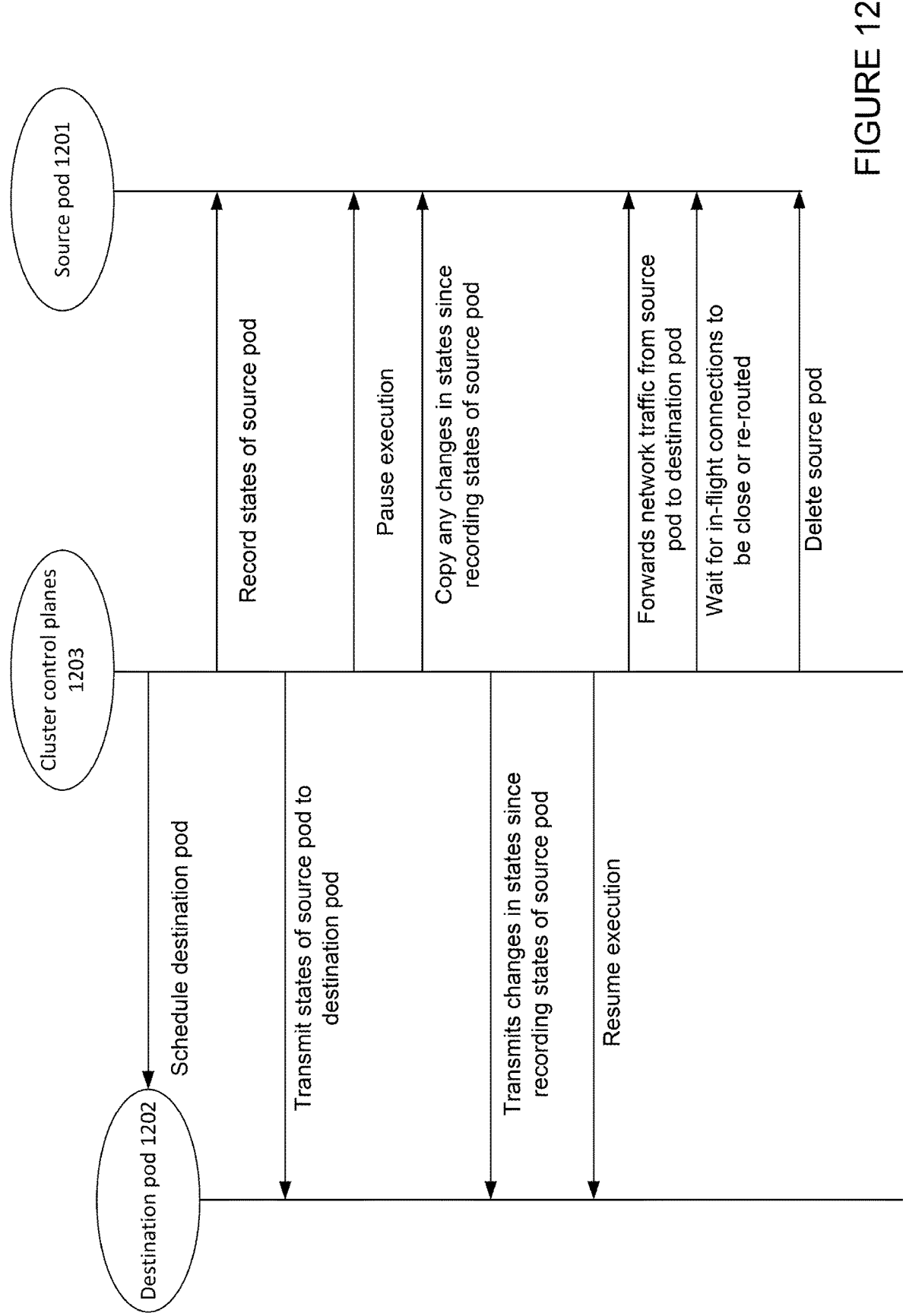
FIG. 12 is a timing diagram illustrating an example live migration for workloads in accordance with aspects of the disclosure.

In addition to migration of cluster control plane, a live migration may be performed for workloads. FIG. 12 is a timing diagram illustrating an example live migration for workloads in a cluster from one environment to another environment. FIG. 12 shows various actions occurring at an old pod 1201 on a node of a first, source cluster, a new pod 1202 created on a node of a second, destination cluster, and the cluster control planes 1203 of the two clusters. The pods may be configured on worker nodes as shown in any of FIG. 4 or 9, for example old pod 1201 may be configured on node 910 of source cluster 400 and new pod 1202 may be configured on node 950 of cluster 500. Although example operations involving only one old pod 1201 and only one new pod 1202 are shown, such operations may be performed for any number of pairs of pods in the source cluster and the destination cluster. The control planes 1203 may include components from the control planes of both the destination cluster and the source cluster, such as those shown in FIGS. 4-7. The timing diagram may be performed on a system, such as by one or more processors shown in FIG. 2 or FIG. 3.

Referring to FIG. 12, while an old pod 1201 is still running on a node of a source cluster, cluster control planes 1203 may schedule a new pod 1202. For example, new pod 1202 may be scheduled by controllers of destination cluster 500. The cluster control planes 1203 may record the states of the old pod 1201, and then transmit these states to the new pod 1202. The cluster control planes 1203 may pause execution of old pod 1201. The cluster control planes 1203 may then copy any changes in states of old pod 1201, and transmit these changes to new pod 1202. The cluster control planes 1203 may then resume execution of pod 1202.

Once the pod 1202 starts execution, network traffic, such as requests from applications or websites directed to old pod 1201, may be forwarded by the cluster control planes 1203 to the new pod 1202. For example, the allocation may be performed by global load balancers as described with relation to FIG. 9. Once workload migration is complete, connection to old pod 1201 may be closed. The old pod 1201 may then be deleted. Still further, during the live workload migration, a live migration of workload storage may be performed as shown in FIG. 10. For example, the live migration of workload storage may be performed during the live migration of requests to workloads.

Figure 13:
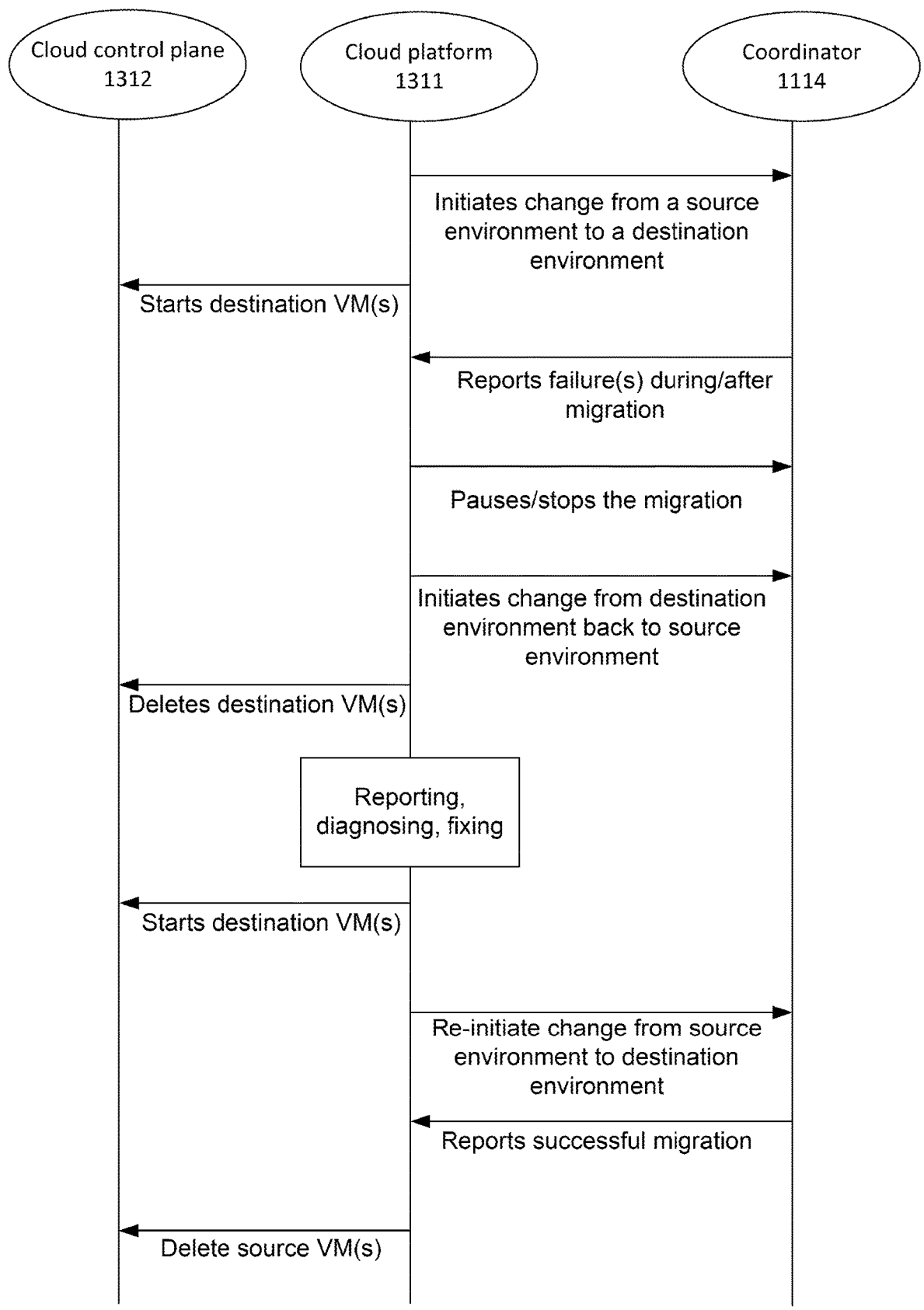
FIG. 13 is a timing diagram illustrating post-migration actions in accordance with aspects of the disclosure.

As mentioned above, the destination cluster may be monitored during and/or after the live migration for failures. As such, FIG. 13 shows example further actions that may be taken based on whether a live migration succeeds or fails. As shown, a change from a source environment to a destination environment may be initiated by a cloud platform 1311 that instructs the coordinator 1114. The cloud platform 1311 may then instruct a cloud control plane 1312 to start one or more new destination VMs for the migration. If the coordinator 1114 reports failures during or after migration to the cloud platform 1311, the cloud platform 1311 may instruct the coordinator 1114 to stop or pause the migration. Additionally, output including information on the detected failures may be generated. For example the information may be displayed to cloud administrators, users, etc.

Alternatively or additionally, the cloud platform 1311 may instruct the coordinator 1114 to initiate a change from the destination environment back to the source environment. Once the rollback is complete, cloud platform 1311 may instruct the cloud control plane 1312 to delete the destination VMs created for the migration. Error reporting, diagnostics, and fixing may then be performed, for example by administrators of the cloud platform 1311. Once the errors are fixed, the cloud platform 1311 may instruct the coordinator 1114 to re-initiate the change from the source environment to the destination environment. Importantly, the workloads running on the clusters never experiences more than a very minor interruption even if the migration fails and is rolled back.

Further as shown, in some instances the coordinator 1114 may report a successful migration. In such cases, if the source VM(s) are on the same cloud as the cloud platform 1311, the cloud platform 1311 may instruct the cloud control plane 1312 to delete the source VM(s). If the source VM(s) are on a different cloud as the cloud platform 1311, the cloud platform 1311 may not be able to do anything to the source VM(s). In that case, a user may need to instruct the other cloud to delete these source VM(s).

Although FIG. 13 shows a number of example actions, not all of the actions may need to be performed, and the order may be different. For example, whether to start a complete rollback or merely pause the migration to fix some failures may be based on a determination of the severity of the failure, or whether the failures already existed prior to the migration. Further in that regard, the reporting, diagnosing, and fixing of failures may occur additionally or alternatively after the migration is paused, and the destination VM(s) may not be deleted, but instead remain so that the migration may be resumed once the errors are fixed.

Figure 14:
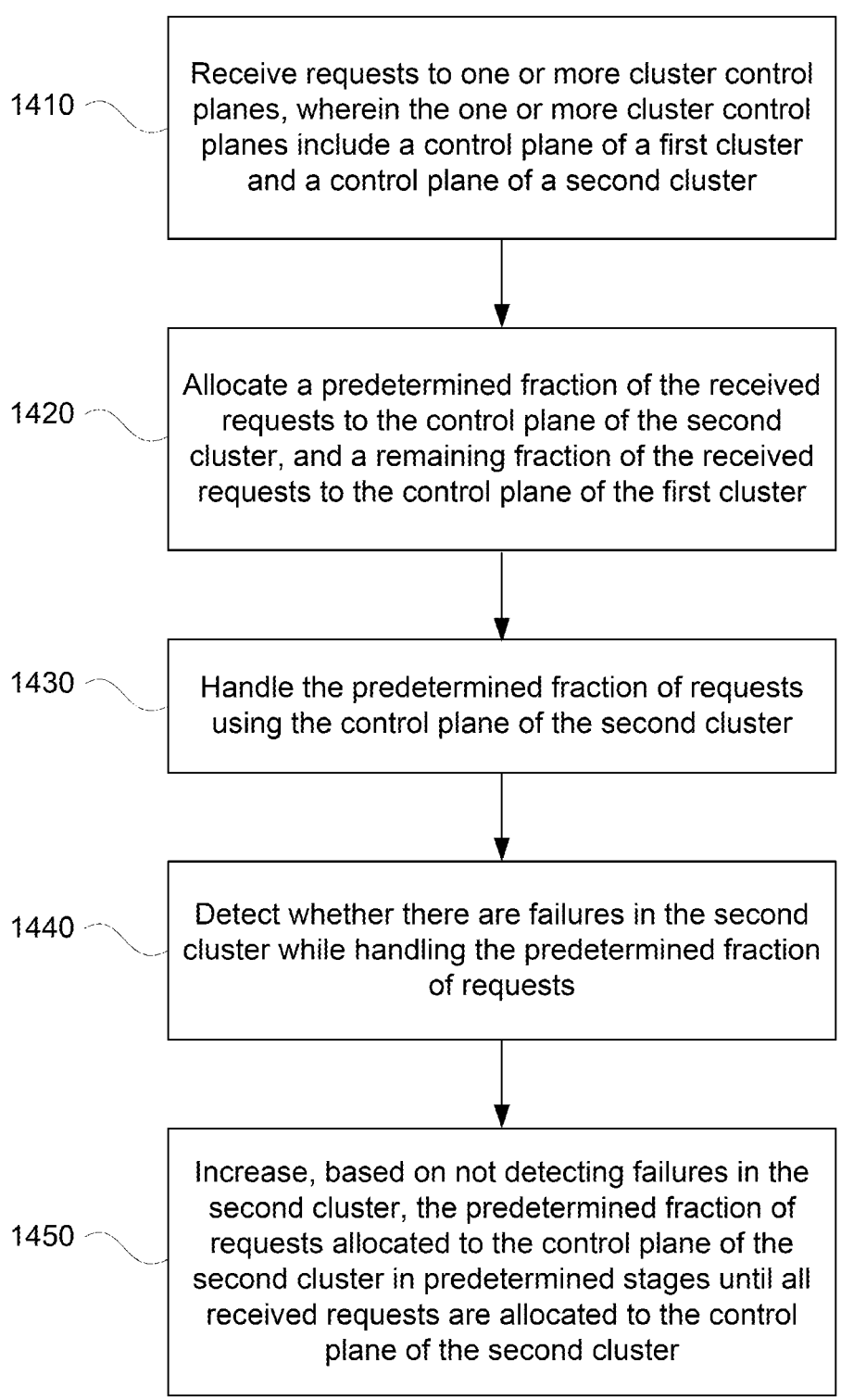
FIG. 14 is an example flow diagram in accordance with aspects of the disclosure.

FIG. 14 is a flow diagram 1400 that may be performed by one or more processors, such as one or more processors 212, 222. For example, processors 212, 222 may receive data and make various determinations as shown in the flow diagram. FIG. 14 shows an example live migration from the control plane of a first cluster to the control plane of a second cluster. Referring to FIG. 14, at block 1410, requests to one or more cluster control planes are received, wherein the one or more cluster control planes may include a control plane of a first cluster and a control plane of a second cluster. At block 1420, a predetermined fraction of the received requests are allocated to the control plane of the second cluster, and a remaining fraction of the received requests are allocated to the control plane of the first cluster. At block 1430, the predetermined fraction of requests are handled using the control plane of the second cluster. At block 1440, while handling the predetermined fraction of requests, it is detected whether there are failures in the second cluster. At block 1450, based on not detecting failures in the second cluster, the predetermined fraction of requests allocated to the control plane of the second cluster is increased in predetermined stages until all received requests are allocated to the control plane of the second cluster.

The technology is advantageous because it provides a gradual and monitored rollout process for upgrading clusters, or modifying other aspects of a cluster's environment. The staged and canaried rollout process provides more opportunity to stop the upgrade in case issues arise, therefore preventing large scale damage. Workload traffic allocation between the simultaneously running source and destination clusters may reduce or eliminate downtime during upgrade. Further, due to the workload traffic allocation, from the perspective of the client it may appear as if only one cluster existed during the live migration. In case of a failed upgrade, the system also provides rollback options since the source cluster is not deleted unless a successful upgrade is completed. The technology further provides features to enable live migration between clusters located in different physical locations, as well as between clusters operated on different clouds where one of the clouds does not support live migration.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for migrating from a first cluster to a second cluster, comprising:
   receiving, by one or more processors, requests to two or more cluster control planes, wherein the two or more cluster control planes include a control plane of the first cluster and a control plane of the second cluster, wherein the received requests include requests from a workload running in the first cluster, wherein the requests from the workload are intercepted by a sidecar container injected in the first cluster and routed to cluster bridging aggregators of the second cluster, wherein the first cluster and the second cluster are operated on different clouds;
   allocating, by the one or more processors, a predetermined fraction of the received requests to the control plane of the second cluster, and a remaining fraction of the received requests to the control plane of the first cluster;
   handling, by the one or more processors, the predetermined fraction of requests using the control plane of the second cluster;
   detecting, by the one or more processors, whether there are failures in the second cluster while handling the predetermined fraction of requests; and
   increasing, by the one or more processors, based on not detecting failures in the second cluster, the predetermined fraction of requests allocated to the control plane of the second cluster in predetermined stages until all received requests are allocated to the control plane of the second cluster.

2. The method of claim 1, wherein the allocation of the received requests are performed in a plurality of predetermined stages, wherein the requests are directed to either the first cluster or the second cluster based on one or more of: user-agent, user account, user group, object type, resource type, a location of the object, or a location of a sender of the request.

3. The method of claim 1, further comprising:
   joining, by the one or more processors, one or more databases in the control plane of the second cluster to a quorum including one or more databases in the control plane of the first cluster.

4. The method of claim 1, further comprising:
   synchronizing, by the one or more processors, one or more databases in the control plane of the second cluster with one or more databases in the control plane of the first cluster, wherein the first cluster and the second cluster are operated on different clouds.

5. The method of claim 1, further comprising:
   allocating, by the one or more processors, a predetermined fraction of object locks to one or more controllers of the second cluster, and a remaining fraction of object locks to one or more controllers of the first cluster;
   actuating, by the one or more processors, objects locked by the one or more controllers of the second cluster;
   detecting, by the one or more processors, whether there are failures in the second cluster while actuating the objects locked;
   increasing, by the one or more processors based on not detecting failures in the second cluster, the predetermined fraction of object locks allocated to the one or more controllers of the second cluster.

6. The method of claim 1, further comprising:
   determining, by the one or more processors, that all received requests are allocated to the control plane of the second cluster;
   deleting, by the one or more processors based on the determination, the control plane of the first cluster.

7. The method of claim 1, further comprising:
   stopping, by the one or more processors based on detecting one or more failures in the second cluster, allocation of the received requests to the control plane of the second cluster.

8. The method of claim 1, further comprising:
   generating, by the one or more processors based on detecting one or more failures in the second cluster, output including information on the detected failures.

9. The method of claim 1, further comprising:
   decreasing, by the one or more processors based on detecting failures in the second cluster, the predetermined fraction of requests allocated to the control plane of the second cluster until all received requests are allocated to the control plane of the first cluster.

10. The method of claim 1, further comprising:
    determining, by the one or more processors, that all received requests are allocated to the control plane of the first cluster;
    deleting, by the one or more processors based on the determination, the second cluster.

11. The method of claim 1, further comprising:
    scheduling, by the one or more processors, a pod in the second cluster;
    recording, by the one or more processors, states of a pod in the first cluster;
    transmitting, by the one or more processors, the recorded states of the pod in the first cluster to the pod in the second cluster.

12. The method of claim 11, further comprising:
    pausing, by the one or more processors, execution of workloads by the pod in the first cluster;
    copying, by the one or more processors, changes in states of the pod in the first cluster since recording the states of the pod in the first cluster;
    transmitting, by the one or more processors, the copied changes in states to the pod in the second cluster;
    resuming, by the one or more processors, execution of workloads by the pod in the second cluster;
    forwarding, by the one or more processors, traffic directed to the pod in the first cluster to the pod in the second cluster;
    deleting, by the one or more processors, the pod in the first cluster.

13. The method of claim 1, further comprising:
determining, by the one or more processors, that a first worker node in the first cluster has one or more pods to be moved to the second cluster;
preventing, by the one or more processors, the first worker node in the first cluster from adding new pods;
moving, by the one or more processors, some of the one or more pods in the first worker node to one or more existing worker nodes in the second cluster;
determining, by the one or more processors, that there is no more capacity in the existing worker nodes in the second cluster;
creating, by the one or more processors, one or more additional worker nodes in the second cluster;
moving, by the one or more processors, the remaining one or more pods in the first worker node to the additional worker nodes in the second cluster;
determining, by the one or more processors, that the first worker node in the first cluster no longer has pods to be moved to the second cluster;
deleting, by the one or more processors, the first worker node in the first cluster.

14. The method of claim 11, further comprising:
receiving, by the one or more processors, requests to one or more workloads, wherein the one or more workloads include workloads running in the first cluster and workloads running in the second cluster;
allocating, by the one or more processors using at least one global load balancer, the received requests to the one or more workloads between the workloads running in the first cluster and the workloads running in the second cluster.

15. The method of claim 1, further comprising:
determining, by the one or more processors, that a pod running in the second cluster references a storage of the first cluster;
creating, by the one or more processors, a storage in the second cluster, wherein the storage of the first cluster and the storage of the second cluster are located at different locations;
reading, by the one or more processors using a storage driver, the storage of the second cluster for data related to the pod in the second cluster;
reading, by the one or more processors using the storage driver, the storage of the first cluster for data related to the pod in the second cluster.

16. The method of claim 15, further comprising:
writing, by the one or more processors, changes made by the pod in the second cluster to the storage of the second cluster;
copying, by the one or more processors, data unchanged by the pod from the storage of the first cluster to the storage of the second cluster.

17. A system for migrating from a first cluster to a second cluster, comprising:
one or more processors configured to:
receive requests to two or more cluster control planes, wherein the two or more cluster control planes include a control plane of the first cluster and a control plane of the second cluster, wherein the received requests include requests from a workload running in the first cluster, wherein the requests from the workload are intercepted by a sidecar container injected in the first cluster and routed to cluster bridging aggregators of the second cluster, wherein the first cluster and the second cluster are operated on different clouds;
allocate a predetermined fraction of the received requests to the control plane of the second cluster, and a remaining fraction of requests to the control plane of the first cluster;
handle the predetermined fraction of requests using the control plane of the second cluster;
detect whether there are failures in the second cluster while handling the predetermined fraction of requests; and
increase, based on not detecting failures in the second cluster, the predetermined fraction of requests allocated to the control plane of the second cluster in predetermined stages until all received requests are allocated to the control plane of the second cluster.

18. The system of claim 17, wherein the first cluster and the second cluster are at least one of: operating different software versions, operating at different locations, operating on different clouds provided by different cloud providers, operating on different clouds where at least one is a user's on-premise datacenter, or connected to different networks.

* * * * *